(12) United States Patent
Holland et al.

(10) Patent No.: US 7,912,075 B1
(45) Date of Patent: Mar. 22, 2011

(54) MECHANISMS AND ALGORITHMS FOR ARBITRATING BETWEEN AND SYNCHRONIZING STATE OF DUPLICATED MEDIA PROCESSING COMPONENTS

(75) Inventors: David S. Holland, Rutland, MA (US); Matthew A. Chandler, Broomfield, CO (US); Michael A. Tamny, Golden, CO (US); Benny Rodrig, Lexington, MA (US); Dave Sueper, Brighton, CO (US); Fraser A. McKinnon, Thornton, CO (US); Dicky A. Pillai, Littleton, MA (US); Bhum C. Kim, Sydney (AU); Randall B. Kramer, Westminster, CO (US); Luke A. Tucker, Beacon Hill (AU); Lee D. Gibbons, Boulder, CO (US); Margaret L. Kelley-Johnson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 928 days.

(21) Appl. No.: 11/441,595

(22) Filed: May 26, 2006

(51) Int. Cl.
*H04L 12/28* (2006.01)
(52) U.S. Cl. ........................................ 370/401; 370/216
(58) Field of Classification Search ................ 714/6, 13, 714/4; 364/200; 370/401, 89, 217, 362, 370/254, 216; 709/203; 710/316; 395/551; 708/700; 371/21
See application file for complete search history.

(56) References Cited

U.S. PATENT DOCUMENTS

| | | | | |
|---|---|---|---|---|
| 4,602,368 A | * | 7/1986 | Circello et al. | 714/718 |
| 4,663,748 A | * | 5/1987 | Karbowiak et al. | 370/224 |
| 4,789,927 A | * | 12/1988 | Hannah | 712/16 |
| 5,862,131 A | * | 1/1999 | Petty et al. | 370/362 |
| 5,896,523 A | * | 4/1999 | Bissett et al. | 713/400 |
| 6,980,559 B2 | * | 12/2005 | Kichise | 370/401 |
| 6,990,512 B1 | * | 1/2006 | Major et al. | 709/203 |
| 2003/0074598 A1 | * | 4/2003 | Bossen et al. | 714/6 |
| 2003/0118039 A1 | * | 6/2003 | Nishi et al. | 370/401 |
| 2003/0131281 A1 | * | 7/2003 | Jung et al. | 714/13 |
| 2004/0034807 A1 | * | 2/2004 | Rostowfske | 714/4 |
| 2005/0080835 A1 | * | 4/2005 | Ohmi et al. | 708/700 |
| 2005/0091304 A1 | | 4/2005 | Trayler | |
| 2006/0085669 A1 | * | 4/2006 | Rostron et al. | 714/4 |
| 2006/0092831 A1 | * | 5/2006 | Hartnett et al. | 370/217 |
| 2006/0250946 A1 | * | 11/2006 | Croak et al. | 370/216 |
| 2007/0201382 A1 | * | 8/2007 | Ekl et al. | 370/254 |
| 2008/0244150 A1 | * | 10/2008 | Sharma | 710/316 |

OTHER PUBLICATIONS

Mediantm™ 5000 VoIP Media Gateway; AudioCodes Voice Network Products for Wireline Applications; 2 pages.
Snoeren et al., "Fine-Grained Failover Using Connection Migration," Mit Laboratory for Computer Science, Cambridge, MA, available at http://nms.Ics.mit.edu/papers/migrate-failover.pdf, 12 pages.

(Continued)

*Primary Examiner* — Kwang B Yao
*Assistant Examiner* — Syed Bokhari
(74) *Attorney, Agent, or Firm* — Sheridan Ross P.C.

(57) ABSTRACT

The present invention is directed, in various embodiments, to a hardware supported duplication token for arbitrating active and standby module states, a weighted state of health exchange for identifying unhealthy module states and relative module health states, and a packet sequence number synchronization technique for maintaining desired levels of synchronization between the active and standby modules.

47 Claims, 11 Drawing Sheets

OTHER PUBLICATIONS

Giuhat, "The Necessary Nine: Beyond Just Basic VoIP Interconnection," Feb. 3, 2005, available at http://www.tmcnet.com/channels/session-border-control/session-border-control-articles/necessary-nine-beyond-voip-interconnection.htm.

Robertson, "Linux-HA Heartbeat System Design," Proceedings of the 4th Annual Linux Showcase and Conference, Atlanta, Oct. 10-14, 2000, Atlanta, Georgia, USA, available at http://www.usenix.org/publications/library/proceedings/als00/2000papers/papers/full_papers/robertson/robertson_html, pp. 305-316.

Cisco CallManager Version 3.2 Data Sheet, Cisco Systems, accessed in 2005, available at http://www.cisco.com/en/US/products/sw/voicesw/ps556/products_data_sheet09186a008007d873.html, 6 pages.

"Device Support," Cisco CallManager System Guide Release 4.0(1), Cisco Systems, accessed 2005, available at http://www.cisco.conn/en/US/products/sw/voicesw/ps556/products_administration_guide_chapter09186a00801ec5af.html#1020706, 5 pages.

* cited by examiner

| Level | Parameter Names | | | |
|---|---|---|---|---|
| N/A | Task Monitor | Critical Link | No DSP | Board, OOS |
| | Hardware | Aggregator Communication | | Firmware Resource |
| 7 | Relative Link | | | |
| 6 | First DSP | Second DSP | Third DSP | Fourth DSP |
| 5 | Software State of Health | Denial of Service Attack | IP Conflict | Network Configuration |

Critical Parameters (Level N/A)
Relative Parameters (Levels 7, 6, 5)

*Fig. 6*

MECHANISMS AND ALGORITHMS FOR ARBITRATING BETWEEN AND SYNCHRONIZING STATE OF DUPLICATED MEDIA PROCESSING COMPONENTS

FIELD OF THE INVENTION

The invention relates generally to converged communications networks and particularly to alternate communication paths for voice communications.

BACKGROUND OF THE INVENTION

IP networks generally provide an excellent infrastructure for geographically distributing components of a telecommunication system. The underlying IP network is optimal for transmission for control signaling, and, when bandwidth is available, can provide an acceptable Quality of Service (or QoS) or Grade of Service (or GOS) for voice communications.

One of the problems of Voice over IP or VoIP communications surrounds system reliability. Existing solutions concentrate on providing call processing capacity with redundant gateways or media network path redundancy without synchronization. The Audiocodes Median Gateway™, for example, supports N+1 redundancy, which typically requires setting up the calls on the board made active (not 1+1 hot standby for call preservation). Call state synchronization solutions are available in some media gateways but selection of the active component is done by a co-resident control plane, not the processing components. Such solutions are based on heartbeat messages with associated timeouts, often requiring complete failure for an interchange to occur. This third party, or software message, model is implemented by software cluster solutions, such as Veritas™, GoAhead™, and HA Linux vendors such as Monta Vista™.

In redundant systems, rapid failure detection and operational control between two devices is difficult to ensure without a third entity acting as tiebreaker or to actually manage the selection of the active device. In a failure situation, the control decision requires ensuring one device is no longer active before enabling the standby device and that usually requires a timeout of some heartbeat because a failing device may not be capable of notifying a peer that it is no longer providing service. Making that timeout period too short leads to conflict, incorrect failure detection (false positives), and more overhead with critical time deadlines. Longer timeouts enable more reliable operation but incur more data loss and associated service disruption, particularly in VoIP applications.

In VoIP systems, fault detection and reporting is considered difficult to generalize. With the increase in demand for highly available systems, some vendors have developed third party libraries and tools to enable the application of failure detection and response to very generalized systems. Unfortunately, these solutions themselves are capable of great complexity and, as a result, they consume system resources and can be difficult to implement reliably, requiring stronger processors and more overhead. For example, GoAhead advertises 54 different states for the software objects representing critical system resources and requires 3.7 Mb of runtime memory and 10 Mb of disk space. In many cases, GoAhead uses only two states, namely simple or failed, and multiple hierarchical relationship and redundancy policies to define behaviors when faults occur. Other script-based systems are capable of simple generalization but quickly become complex as multiple objects or events interact to determine fault behavior and are synchronized between redundant systems. These systems also require interpreted languages typical of workstation class systems. The complexity of the various systems is surprising in light of the fact that software development studies have shown a direct correlation between complexity and errors in implementation.

Other systems concentrate on database synchronization between servers. These systems are too large for smaller, embedded systems.

SUMMARY OF THE INVENTION

These and other needs are addressed by the various embodiments and configurations of the present invention. The present invention is directed generally to controlling and effecting transitions between active and standby processing systems. The processing systems may be in use in VoIP gateways or in other types of solutions, including, without limitation, call control servers supporting functions such as audio/video conferencing or announcements.

In a first embodiment of the present invention, a method for operating a duplicated processing system includes the steps:

(a) a first processing system determining whether a duplication token (e.g., hardware supported semaphore) has been asserted by a second processing system during a selected time interval;

(b) when the duplication token has been asserted by the second processing system during the selected time interval, maintaining the first processing system in the standby state; and (c) when the duplication token has not been asserted by the second processing system during the selected time interval, changing the state of the first processing system from the standby state to the active state, thereby causing the first processing system to assume control of a function performed previously by the second processing system.

In one configuration, the duplication token is a hardware supported semaphore that is used to signal unequivocally that the processing system is in possession of a TDM resource(s) and network address(es). It is maintained by the operating system "tick" function, which maintains the hardware watchdog of the system. Thus, when the tick fails to refresh the semaphore the hardware will reset itself shortly and, until the processing system has been reset, the processing system maintains control of the semaphore. The semaphore signal is latched by the hardware (e.g., Field Programmable Gate Array or FPGA) on the standby processing system in the same "tick" function and resolves to a single memory value. The single memory value indicates whether the semaphore is owned, contended or available. The duplication management process on the standby processing system reads this value periodically (e.g., every 200 milliseconds) to determine when the standby system needs to become active. This limits the controlled health timeout to a short time interval (e.g., ⅕ second), even when the embedded software encounters an exception and is present but not participating. As will be appreciated, shorter time intervals may be employed, such as 50 milliseconds. Prior art mechanisms do not detect the internal reset until a heartbeat timeout.

In another embodiment, a method for operating a duplicated processing system includes the steps:

(a) determining, for each of first and second processing systems, a bit array including multiple bit sets, each bit set corresponding to a one or more functional parameters, each of the which defines a state of a functional aspect of a corresponding processing system, a first type of functional parameter indicating a critical functional aspect and a second type of functional parameter indicating a noncritical functional aspect;

(b) for each of the first and second processing systems, arithmetically assigning, based on the values of the corresponding plurality of bit sets, first and second cumulative health state values, respectively;

(c) when the second cumulative health state value equals or exceeds the first cumulative health state value, maintaining the second processing system in an active state; and (d) when the first cumulative health state value exceeds the second cumulative health state value, changing the state of the first processing system from a standby to the active state and the state of the second processing system from the active to the standby state.

In one implementation, the first and second cumulative health state values are derived by arithmetically summing the corresponding bit array. When the selected processing system determines that its health state value is less than the other processing system's health state value and the other processing system's health state value is greater than a threshold value indicative of a minimum state of health, the selected processing system effects a change of state of itself and the other processing system.

In one configuration, the bit mapping health mechanism is used to evaluate local board health status for transitions periodically (e.g., every 125 milliseconds or eight times per second). If a transition is detected, the bit mapped values are transmitted to the standby board on a private serial link. If either a bit map update or a local transition is detected, the bit maps are summed to a numerical value, and a simple arithmetic comparison performed to determine which device should be active. The simplicity of the comparison is a significant advance over the prior art. As will be appreciated, there is a direct and documentable correlation between complexity and errors in software systems.

The arithmetic value also indicates the severity of the fault detected, and, when the severity is above a threshold that indicates that the board is no longer capable of providing service, it disables access to the common resource(s) and clears the semaphore. If the active board is not capable of disabling access due to the nature of the fault, the active board executes a self-reset, and the standby board detects the reset within a short period (e.g., 200 milliseconds). If the standby board receives indication of a fault on the active board (or health updates are not exchanged for a selected period of time (e.g., 1.5 seconds) over either the private serial link or the IP network), the standby board issues a request for the active board to release the semaphore. A short time (e.g., one second) later, if the active board has not released the semaphore, the standby board will issue a backplane reset of the active board to force release of the semaphore. As will be appreciated, both boards driving a single, shared TDM bus is less desirable than neither driving the board (i.e., noise is less desirable than silence). The semaphore effects control of the bus to avoid dual concurrent use. When the semaphore is free, a board knows that the TDM bus is clear.

In yet another embodiment, a method for implementing a duplicated processing system includes the steps:

(a) providing first and second processing systems, the second processing system being in the active state and the first processing system being in the standby state, the second processing system having, for each call, a transmit packet stream and a second transmit packet sequence number and transmit rollover counter value, wherein the first processing system has, for each call, a first transmit packet sequence number and transmit rollover counter value, the first transmit packet sequence number being representative of the second transmit packet sequence number and the first transmit rollover counter value being representative of the second transmit rollover counter value;

(b) the first processing system incrementing the first transmit packet sequence number and rollover counter while in the standby state; and (c) upon the occurrence of a trigger event, adjusting the first transmit packet number and/or rollover counter values by a shift value representative of a temporal drift between the relative values of the first and second transmit packet number values.

In one configuration, drift between the transmit sequence numbers on the active and standby boards is accounted for using the shift value. In the absence of silence suppression, the transmit sequence numbers of both the active and standby boards should track one another with a constant shift between the numbers. When silence suppression is enabled, the lack of inbound RTP data can cause a difference in outbound packet generation if the echo cancellation algorithm removes background signal on the active but not the standby board's transmit packet streams. Upon switchover, the newly active board uses a packet sequence number higher than the last sequence number used by the formerly active board, thereby providing switchover transparency to the parties to the call.

The present invention can provide a number of advantages depending on the particular configuration.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 6 is a state of health table according to an embodiment of the present invention;

DETAILED DESCRIPTION

The Architecture

Figure 1:
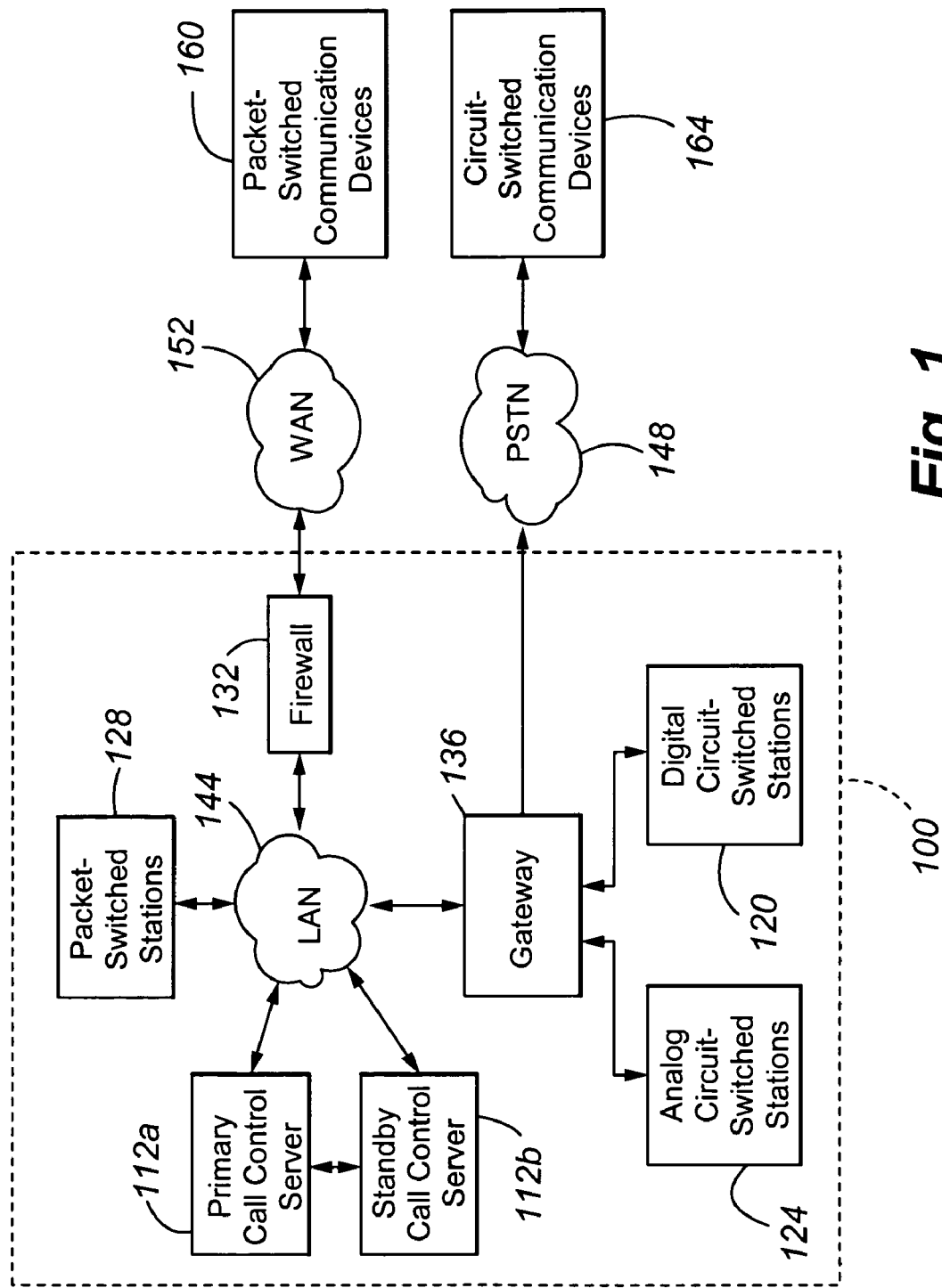
FIG. 1 depicts a telecommunications system according to an embodiment of the present invention.

With reference to FIG. 1, a telecommunications architecture is depicted according to an embodiment of the present invention. The enterprise 100 has separate, independent, and active or primary call control server 112a and standby call control server 112b with resident call controller functionality. The enterprise also includes a plurality of digital circuit-switched stations 120 and analog circuit-switched stations 124, a plurality of IP or Internet Protocol stations 128, a gateway 136, and a firewall 132, all interconnected by a Local Area Network or LAN 144. The gateway 136 is interconnected by Wide Area Network or WAN 152 and Public Switched Telephone Network or PSTN 148 to external packet-switched and circuit-switched communication devices 160 and 164, respectively.

Each of the subscriber digital and analog stations 120 and 124 and packet-switched stations 128 and external packet-switched and circuit-switched communication devices 160 and 164 can be one or more wireline or wireless packet-switched and/or circuit-switched communication devices, as appropriate. For example, the digital stations can be digital telephones such as Digital Communications Protocol or DCP phones, Integrated Services Digital Network (ISDN) endpoints (BRI and PRI terminal equipment including telephones and video endpoints), voice messaging and response units, traditional computer telephony adjuncts, and wired and wireless circuit-switched telephones, the analog stations can be a Plain Old Telephone Service or POTS, and the packet-switched stations can be any packet-switched communication device, such as Avaya Inc.'s IP phones such as 4600 Series IP Phones™, IP softphones such as Avaya Inc.'s, IP Softphone™, Personal Digital Assistants or PDAs, Personal Computers or PCs, laptops, and H.320 video phones and conferencing units.

The media gateway is an electronic signal repeater and protocol converter that commonly provides a telephone exchange service, supporting the connection of the various types of stations and outside packet-switched and/or circuit-switched telephone lines (such as analog trunks, ISDN lines, E1/T1 voice trunks, and WAN route IP trunks). Telephone lines are typically connected to the gateway via ports and media modules on the chassis, with different media modules providing access ports for different types of stations and lines. Voice and signaling data between packet-switched and circuit-switched protocols is normally effected by the media modules converting the voice path to a TDM bus inside the gateway. An engine, such as a Voice Over IP or VoIP engine, converts the voice path from the TDM bus to a compressed or uncompressed and packetized VoIP, typically on an Ethernet connection. Each gateway commonly includes a number of port and trunk circuit packs for performing selected telecommunications functions, such as (DTMF) tone detection, tone generation, playing audio (music and/or voice) announcements, traffic shaping, call admission control, and a media processor, and one or more IP server interfaces. Examples of gateways include Avaya Inc.'s SCC1™, MCC1™, CMC™, G350™, G600™, G650™, and G700™. As will be appreciated, the gateway and server may be co-residents, as in the G700™ and S8300™.

The primary and spare call control servers controlling the gateway can be any, typically converged, architecture for directing circuit-switched and/or packet-switched customer contacts to one or more stations. As will be appreciated, the primary call control server normally controls the gateway. Commonly, the call control servers are stored-program-controlled systems that conventionally include interfaces to external communication links, a communications switching fabric, service circuits (e.g., tone detectors and generators, announcement circuits, etc.), memory for storing control programs and data, and a processor (i.e., a computer) for executing the stored control programs to control the interfaces and the fabric and to provide automatic contact-distribution functionality. Illustratively, the call control servers can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Avaya Inc.'s IP600™ LAN-based ACD system, or an S8100™, S8300™, S8500™, S8700™, or S8710™ call control server running a modified version of Avaya Inc.'s Communication Manager™ voice-application software with call processing capabilities and contact center functions. Other types of known switches and servers are well known in the art and therefore not described in detail herein.

The LAN 144 and WAN 152 are packet-switched networks. The LAN 144 is typically governed by the Ethernet protocol while the WAN is typically governed by the Transport Control Protocol/Internet Protocol suite of protocols.

The PSTN 148 is, of course, circuit-switched.

Figure 2:
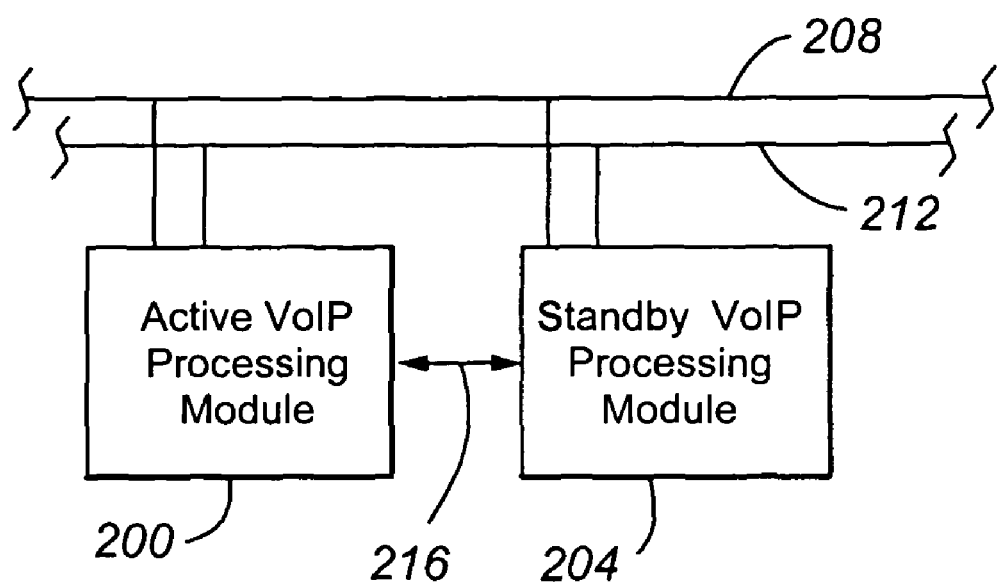
FIG. 2 is a block diagram of active and standby processing modules in a media gateway according to an embodiment of the present invention.

FIG. 2 shows two redundant VoIP processing modules in the gateway 136. The active, or second, VoIP processing module 200 is duplicated by the standby, or first, VoIP processing module 204. The modules perform a variety of VoIP-related functions including echo cancellation, adaptive jitter buffering, fax and Dual Tone Multi-Frequency detection and generation, and the like. The first and second modules 200 and 204 are interconnected by a Time Division Multiplexed or TDM bus 208, private link 212, and arbitration link 216. The TDM bus 208, private link 212 (which is a bus configuration and preferably not a serial point-to-point link) for asserting a duplication token, and arbitration link 216 (which is a bus configuration and preferably not a serial point-to-point link) for arbitrating which module is active and standby, exchanging state-of-health information, and exchanging pertinent call state information and encryption information are typically located in the backplane of the media gateway 136. The use of a bus configuration for the private and arbitration links allows any-to-any slot relationship for peering and is distinct from existing point-to point serial backup links in cluster configurations. The first and second modules are configured with a virtual Media Access Control and IP address tied to both of the modules. The first module 200 will send and receive all traffic for the virtual network address while the second module 204 will not transmit with the virtual addresses. At failover, the second module 204 starts sending and receiving with the virtual address.

Figure 3:
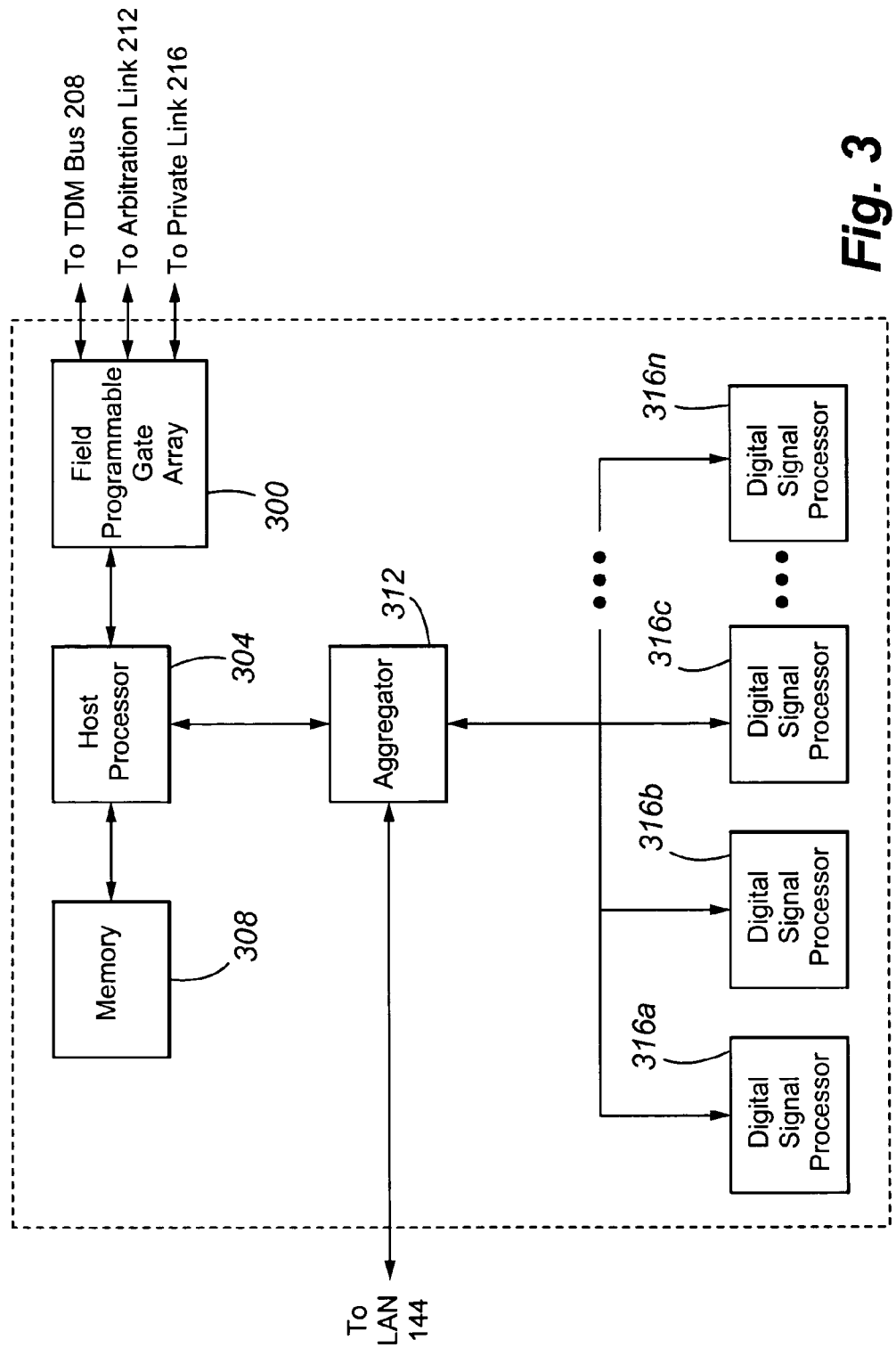
FIG. 3 is a block diagram of a processing module or system according to an embodiment of the present invention.

FIG. 3 shows the hardware layout of each of the modules 200 and 204. The modules each include a Field Programmable Gate Array or FPGA 300, a host processor 304, a memory 308, an aggregator 312, and a plurality of Digital Signal Processors or DSPs 316a-n. The FPGA 200 provides interfaces to each of the TDM buses, arbitration link, and private link and includes a register for receiving a duplication token from the other module, as discussed below. The host processor 304 and associated memory 308 perform collectively a number of software-related functions that are discussed below. The aggregator 312 is effectively an intelligent conduit that physically connects the DSPs 316a-n within the DSP farm or array to the LAN 144. The aggregator 312 performs a variety of functions including terminating the Ethernet protocol, transferring control messages to and from the DSP farm and the host processor 304, classifying the incoming packets from the network as either voice-bearer or non-voice packets, transferring valid User Datagram Protocol or UDP bearer packets to the DSP farm and other packets to the processor 304, transferring media data from the DSP farm and host-generated packets such as pings, to the LAN 144, and performs housekeeping functions for the DSP farm, such as DSP initialization. The DSP farm executes media processing algorithms for voice and for processing fax and modem and basic packetization/encapsulation for Real Time Protocol or RTP/UDP and Real Time Control Protocol or RTCP, and performs echo cancellation, adaptive jitter buffering, DTMF detection/generation, and media encryption. Each DSP has an associated memory for local data storage. By way of example, in the TDM-to-packet direction, the DSPs assemble a packet by copying a sequence of digital samples from a timeslot on one of the TDM buses, converting the sequence into digitally encoded bits such as linear Pulse Code Modulation or compressed audio, internal to the DSP encoding the packet using the specified codec, and adding RTP and UDP headers. The packet is then sent to the aggregator, where IP and MAC header information is added before being sent to the LAN 144. In the reverse direction, the aggregator uses the destination UDP port number to route the packet to the proper DSP. Any UDP port can be routed to any DSP. The DSP decrypts and decodes the packet and then places it on the specified timeslot on one of the TDM highways. The FPGA then performs a Time Slot interchange or TSI function, placing the data onto the appropriate backplane TDM bus timeslot. A port board listening to the timeslot then completes the end-to-end path.

Figure 4:
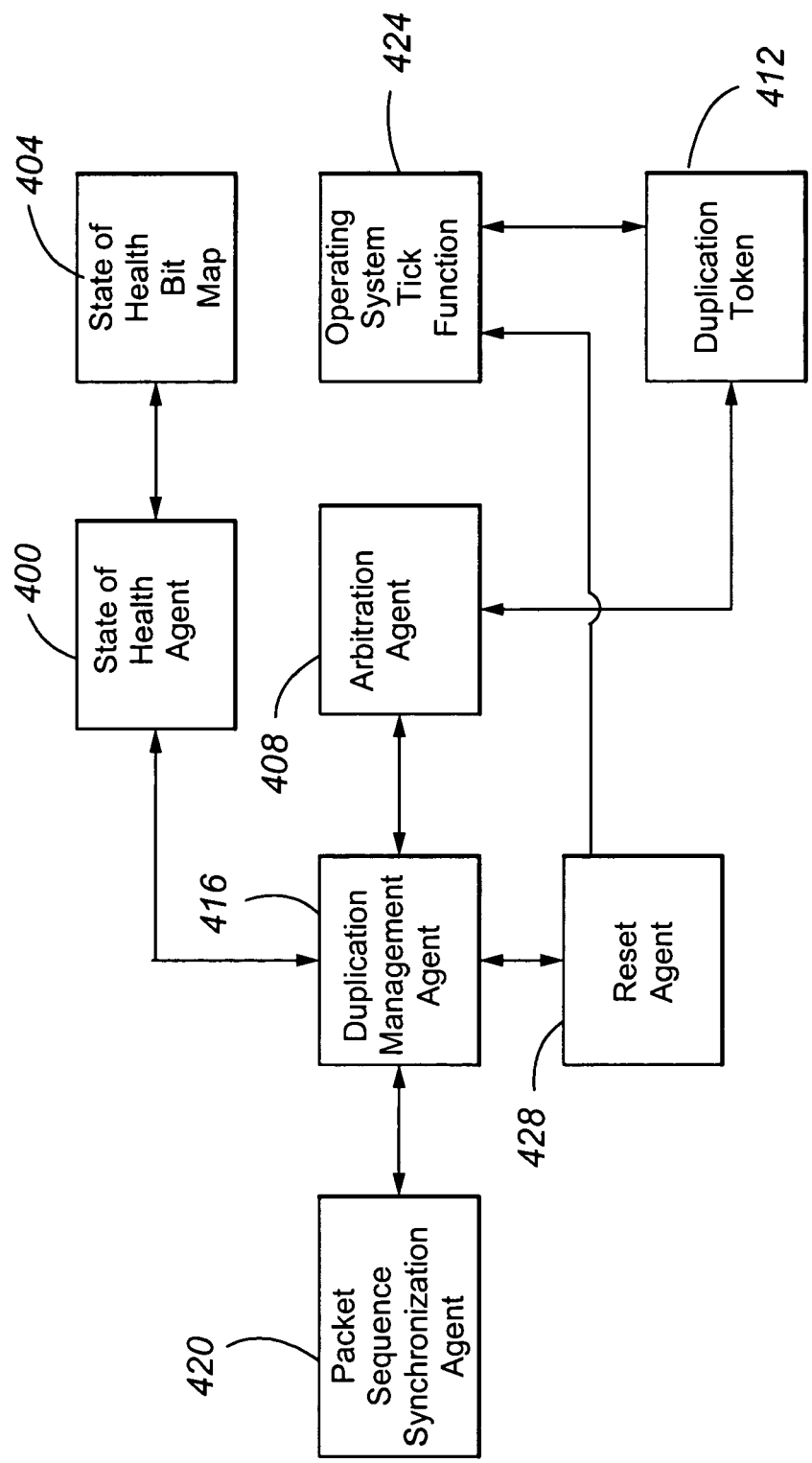
FIG. 4 is a block diagram of the logical components of the processing module of FIG. 3.

FIG. 4 depicts selected logical components of the first and second modules. As will be appreciated, the components may be implemented in hardware, software, or a combination thereof.

A state-of-health agent 400 collects state-of-health parameters regarding the corresponding module, generating a bitmap 404 including values of the state-of-health parameters, forwarding the bitmap to the other module, and comparing the bitmap 404 of the selected module to the bitmap of the other module to determine which module is healthier and/or should be the active module.

An arbitration agent 408 monitors a register of the FPGA 300 for a duplication token 412 asserted by the other module, asserts a duplication token 412 in an FPGA register of the other module, and notifies the duplication management agent 416 of the duplication token state. The token unequivocally signals that a module is in possession of the TDM bus and the virtual network addresses. The token is latched by the FPGA of the receiving module and resolves to a single memory value that indicates the state of the token. The token is cleared by the agent 408 and will not be set again until a module initiates another token cycle. The state may be available (meaning that the corresponding module can, by asserting the duplication token, be the active module), owned (meaning that the other module has already asserted the duplication token and is the active module), and contended (meaning that the duplication token is neither available nor owned and both modules are currently attempting to assert the token and become the active module).

In one configuration, the FPGA defines four memory mapped registers to provide the token functionality. The first register is an address register loaded with the value of the slot number of the current module. The second register is an address register loaded with the value of the slot number of the peer module. A third register is written to set the token based on the address of the current module. This register is latched by the hardware until the hardware token cycle is completed and then cleared by the hardware. The fourth register latches the hardware token cycle of the current module and the peer module. These token assertions are represented by two bits in the token status register.

A packet sequence synchronization agent 420, depending on the state of the module (e.g., whether active or standby) generates and sends events containing the current (RTP) packet sequence number and roll over counter (referred to as reliability data or information) for both receive and transmit packet flows of each call or channel to the other module's agent 420 and uses the reliability information to synchronize the state on the standby module to ensure that the roll over counter of the receive stream matches the source for secure RTP flows and to ensure that the values sourced by the standby module when it becomes active are consistent with the currently expected values at the receiver. Reliability information is exchanged when a call is established, on demand from the other agent 420, or periodically based on a configurable time.

An operating system tick function 424 and reset agent 428 provide a hardware watchdog functionality. The tick function 424 of the operating system generates periodically a time-tick interrupt signal that is used for module processing and self-monitoring operations. If a time-tick interrupt signal is not received by the reset agent 428 at the appropriate time, the reset agent 428 causes a reset of the corresponding module. The time tick function 424 further provides timing information 8, which can be used to determine when to assert or look for a duplication token in the appropriate register of the FPGA.

A duplication management agent 416 monitors and controls operations of the foregoing components.

The Arbitration Mechanism

The arbitration mechanism used to set module state will now be discussed with reference to FIG. 5. Prior to discussing the operation of the arbitration agent 408, it is important to understand a number of requirements of module duplication. The state transition between boards is preferably performed quickly enough that the user, who is on a call, be unaware of any interruption in service. To avoid unnecessary delays, the state of the modules is preferably not arbitrated by a third party. Because no third party is arbitrating the relative states of the two modules, the modules need to be able to effect arbitration between themselves relatively quickly. Moreover, because both of the modules share the same TDM bus, the state change of the modules is preferably performed so that both modules are not using the bus at the same time. Concurrent use of the TDM bus can cause a system-wide failure. Thus, if the active module fails in such a way that it is unable to notify the other module that it is relinquishing the TDM bus, the other module preferably can cause the other module to reset itself and thereby relinquish the TDM bus. The foregoing functions are effected using a duplication token, such as a semaphore.

Terminology used in FIGS. 5 and 10-13 further needs to be clarified. The duplication token, also referred to as a soft bit, refers to the bit value asserted in the FPGA 300 while a token grab refers to a bit stored in the memories of each of the first and second modules that determines whether or not the corresponding module will attempt to obtain ownership of the duplication token.

When the module is powered on, the module starts in the initial state. In the initial state, the module establishes its public interfaces and waits for a command from the higher level call control software, such as Communication Manager™ by Avaya, Inc., to proceed to either the simplex (unduplicated) or duplication mode. When a module is in the simplex mode, it will necessarily be in the active state and not recognize a peer or standby module. In the simplex mode, the agent 408 merely verifies that both the local process control and the higher level control software are aware of the completed transition to the simplex mode, and the agent will continue to process duplication downlink messages but only a mode change to duplex will cause a mode and/or state transition. When a module is configured for duplication, it requires a virtual IP and virtual MAC address, duplication peer IP address (of the other module), and peer TDM address. This information is generally provided by the higher level control software.

In the initialization state, the module configures and initializes its internal components. After internal initialization, the agent monitors for messages from higher level control software and accepts status and mode commands, but rejects interchange commands (which cause the modules to effect an interchange of control or to transition from the active to the standby state and vice versa). A status command causes the module to be locked or unlocked, and a mode command can request a mode update and/or cause the module to transition to a different mode.

Before the duplex mode can be entered by the module, the agent 408 ensures that all required data has been received. If so, the agent 408 then proceeds to the arbitrate state to determine whether or not the module should be in the active or standby state. To prevent oscillation, when the last module reset resulted from a request of the peer module or a self-reset the module sets a damper timer and will not attempt to arbitrate for ownership of the soft token until the timer has expired. Additionally, if the higher level control software has configured the module to be locked in the standby state or if the peer module has already acquired the soft token, the board will not attempt to arbitrate but go directly to the standby state. If the module is configured as simplex, it will transition to the simplex state without examining the last reset or any additional configuration data.

Figure 5:
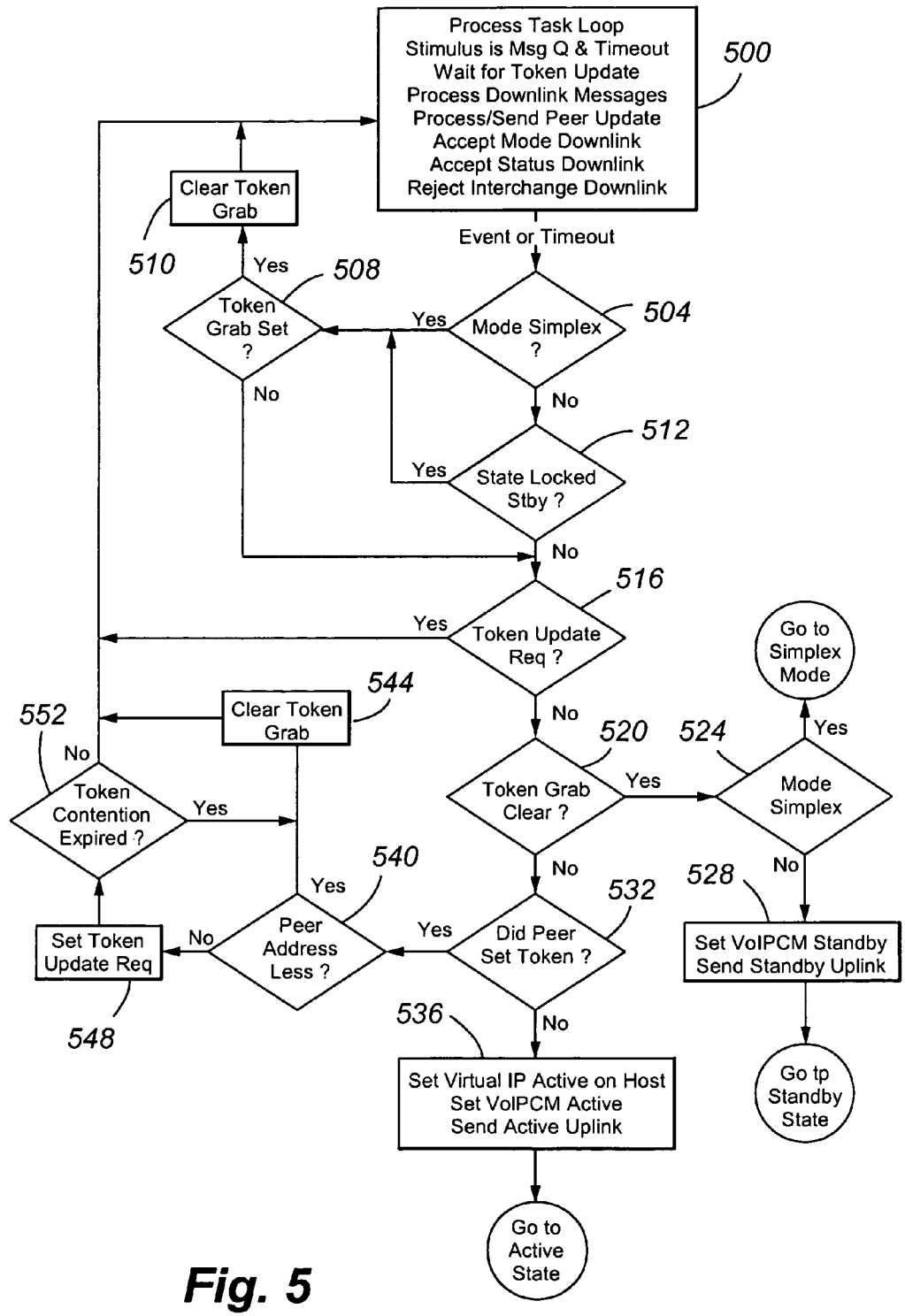
FIG. 5 is a flowchart depicting an operation according to an embodiment of the present invention.

FIG. 5 assumes that the module has been initialized and has moved from the initial state to either the simplex or duplication mode. In step 500, the agent waits for a stimulus, which is typically a predetermined event or timeout. The event refers to the receipt in a message queue of a configuration message from the higher level control software. The message can be a mode or status command. Interchange commands are rejected. The timeout refers to the time at which the arbitration agent 408 is to perform the process task loop shown in FIG. 5. The timeout period ensures that sufficient time has elapsed since the assertion of the soft bit for the peer module to receive and recognize that the soft bit has been asserted. Otherwise, any mode change may be premature and cause a conflict.

When the stimulus occurs, the agent 408 proceeds to decision diamond 504 and determines whether the module is in the simplex mode. When the module is in the duplex mode, the agent proceeds to decision diamond 512 and determines whether the module is in the locked standby state. In the locked standby state, the module is commanded by the higher level control software to reject any interchange commands and remain in the standby state.

When the module is in the simplex mode or when the module is in the locked standby state, the agent proceeds to decision diamond 508 and determines whether the token grab bit has been set. When the token grab is set, the agent 408 clears the token grab bit in step 510 and returns to step 500. When the token grab is not set or when the module is not in the locked standby state, the module proceeds to decision diamond 516.

In decision diamond 516, the agent determines whether a token update is required. This step is intended to ensure that enough time has passed between the time that the soft bit has been asserted to permit the peer module to receive and recognize the asserted soft bit. For example, if the stimulus is an event, the event may have occurred before this needed time has passed. When a token update is required, the agent returns to step 500. When a token update is not required, the agent proceeds to decision diamond 520.

In decision diamond 520, the agent determines the state of the token grab. When the token grab is clear, or not set, the agent proceeds to decision diamond 524 and determines whether the module mode is already set to simplex. When the module mode is already set to simplex, the agent proceeds to the simplex mode. When the module mode is not currently set to simplex, the agent, in step 528, sets the local module process controller (which controls the messages passing between the DSPs in the module and the higher level control software, and/or which sets and tears down VoIP calls) to standby and sends a standby notification to the higher level software control. The agent then proceeds to the standby state.

Returning to decision diamond 520 when the token grab is not clear, or is set, the agent proceeds to decision diamond 532 and determines whether the peer module has asserted the duplication token (by transmitting a pulse that is latched by the FPGA of the host module). If the peer module has not yet asserted the duplication token, the agent proceeds to step 536, sets the virtual IP address and local module process controller on the host module to active and sends an active notification to the higher level software control. The agent then proceeds to the active state (meaning that the duplication token is "owned" by the host module) because the agent has concluded that there is not contention with the peer module.

Returning to decision diamond 532 when the peer module has asserted the duplication token (meaning that the token state is contended), the agent proceeds to decision diamond 540 where it determines whether the peer module's address (which may be peer IP or TDM address) is less than the host module's corresponding address. As will be appreciated, other arbitration criteria can be used such as module hardware identifier (e.g., serial number) and some other configurable parameter or setting. When the peer module's address is less than the host module's address, the agent, in step 544, clears the token grab and returns to step 500. When the peer module's address is greater than the host module's address, the agent, in step 548, sets a flag indicating that a token update is required and starts a timer for a token contention period.

In decision diamond 552, the agent determines whether the token contention period has expired. If so, the agent concludes that the peer module has obtained ownership of the duplication token and proceeds to step 544. If not, the agent returns to step 500.

The State of Health Mechanism

Figure 7:
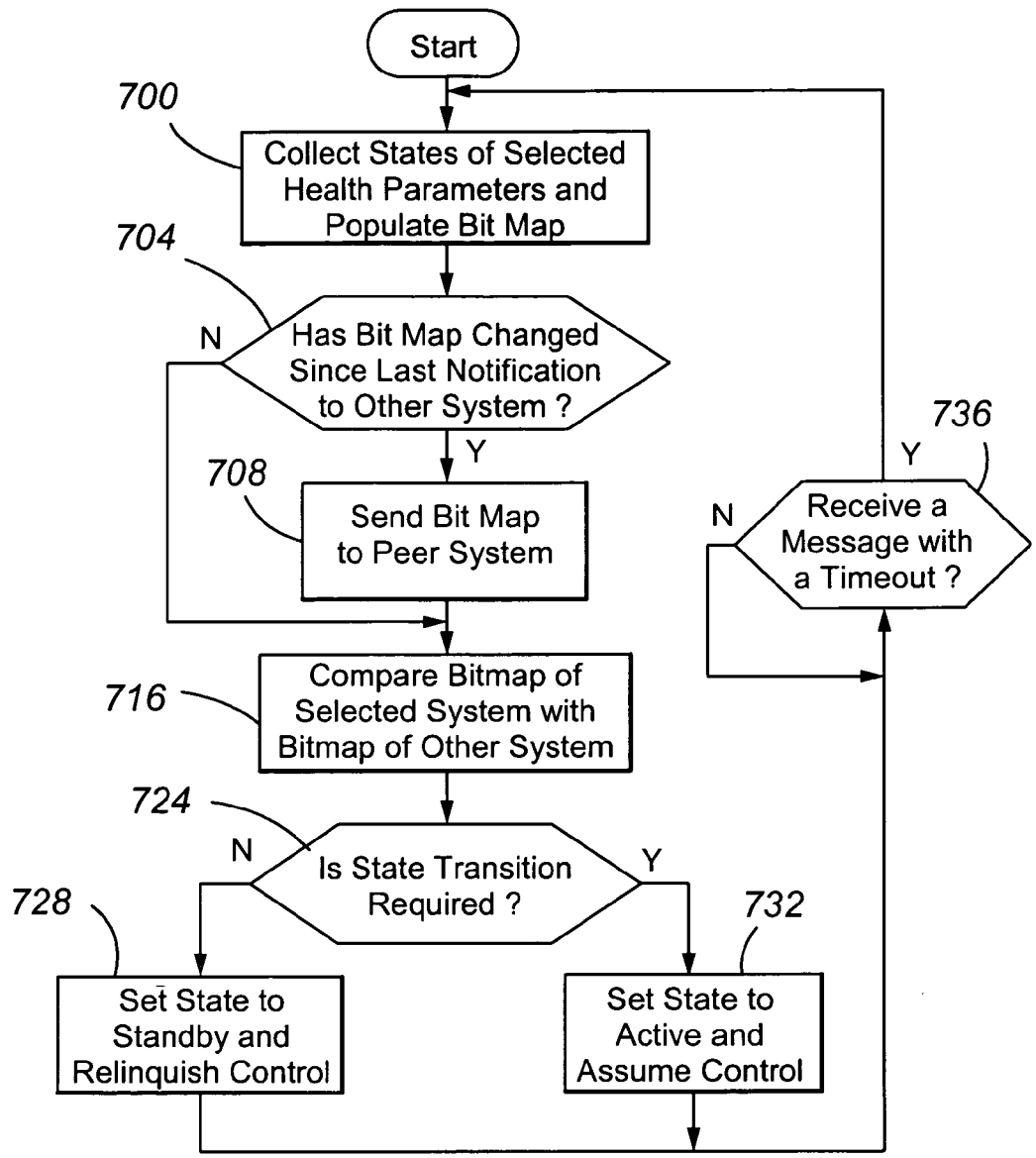
FIG. 7 is a flowchart depicting the operation of the state of health and duplication management agents according to an embodiment of the present invention.

Referring now to FIGS. 6 and 7, the state-of-health agent 400 and bitmap 404 will now be described. The bitmap 404 is a configurable bit array representing between 5 and 40 critical functional parameters (defined such that, if a fault were to occur in that functional element, the entire module would be unsuitable to provide a set of functions, typically its critical functions) and between 8 and 64 relative functional parameters (defined such that degraded service is possible if that functional element were to be faulted). A "parameter" is an object associated with a hardware or software state. An example of a critical fault would be removal of the Ethernet link, which would prevent the module from making calls. An example of a relative fault is failure of one of the DSPs. Although the call capacity of the module is reduced, calls can still be supported by other DSPs. The relative parameters are weighted in fixed groupings between 2 and 8 elements wide, permitting equivalency and differentiation between these partial faults. Each parameter in the bitmap has a binary state that is either GOOD or FAULTED.

Each health parameter has between 1 and 32 input state parameter monitors. A "monitor" is an object that is associated with a health parameter and is used to update the state of the associated parameter. The health parameters and associated monitors are preferably implemented as a library Application Programming Interface and not a task. Relative faults have differing levels of severity from 7 (high) to 0 (low) that are used by the agent 400 to determine which module is healthier. For example, the DSP fault can be given a higher severity than another fault that indicates that a DSP status query has failed. If these faults occur on two different modules, the difference in severity allows the agent 400 to know that the module with the status query failure should be the active module because, when compared to the other module's fault, it is not as severe.

Health parameters represent a group of related health monitors by OR-ing the state of the health monitors to determine the overall state of the health parameter. In other words, if any health monitor is in a faulted state, the corresponding health parameter is also in a faulted state. This design provides many different monitors to maintain the health of individual faults. At the same time, the design groups the diverse inputs into classes, or parameters, that quickly identify the type of fault that has occurred.

The parameter monitors are modeled to represent three types of hardware switches, namely "Normally Open", "Normally Closed", and "Toggle". These represent three types of action. Normally open switches, also known as heartbeat monitors, must be constantly activated to remain in a contact closure state. This type of construct is suitable for a heartbeat function. In one configuration, the heartbeat monitor is in the FAULTED state by default, and normal operational software must be used to keep the monitor in the GOOD state. This type of monitor is used to ensure that management of critical hardware is occurring. Normally closed switches, also known as fault monitors, are in a contact closure state unless activated and must be constantly activated to maintain an open state. This construct is suitable for time decay functions like damper events. In one configuration, the fault monitor is in the GOOD state by default. If a test passes, nothing need be done. If the test fails, a fault monitor can be placed in the FAULTED state. As long as the test continues to fail, the monitor will stay in the FAULTED state. When the error condition has cleared and the test passes, the fault monitor will automatically return to the GOOD state. Toggle switches, also known as edge monitors, are simple on/off constructs and are the most common switch type. In one configuration, edge monitors record the state of a monitor as GOOD or FAULTED. Edge monitors are used to manage health status indications that are always in a GOOD or FAULTED state and require no further verification or additional analysis. One example is an Ethernet link or LAPD link that is either up (GOOD) or down (FAULTED). In addition to type behavior, each monitor has a debounce period which is the inter-event timeout for opened or closed monitors and the delay between any edge and the propagation of the transition into the monitor state for toggle monitors.

The 32 parameter monitors have a flat relationship to the parameters; that is, all monitors of a parameter must be GOOD for the parameter to be good. This permits a variety of independent monitoring activity for each parameter. For example, a temperature control parameter may have a clocking monitor to ensure valid readings are available and it may have a limit monitor to ensure the actual temperature in the operational range. Furthermore, the same event may have multiple parameters with different debounce periods so that a temperature clocking fault may be relative until some later time when it becomes critical. With 32 monitors per parameter, the system supports between 160 and 1280 critical fault events and between 256 and 2048 relative fault events.

By inverting the natural "on=1, off=0" of the parameter and monitor bits, evaluation of the aggregated state of all monitors and parameters is done by arithmetically summing the words of the bitfields into a single 32 bit representation. It is evident that with negative logic a minimum value is required to establish suitability of the module for operation and that an arithmetic comparison of each device relative to another indicates the best or worst device of a set with higher numbers representing better state. Additionally, the inversion permits new monitors and parameters for existing systems because until it is represented it cannot be faulted, which is the basis of the evaluation.

The state-of-health mechanism provides an active bias value that can be used to modify the effect that a relative parameter has on the decision to interchange the module states. Each relative parameter has a weight value that is equal to a power of two based on the priority level of the parameter. For example, a level two parameter has a weight of two squared or four. The sum of the faulted relative parameters' weights must be greater than the active bias value to affect the decision to interchange. For example, an active bias value set to 31 would require a relative health parameter to be a level five or greater to have an instant impact on the interchange decision. Any relative parameters lower than level five need to be summed with other relative parameters to exceed this value and cause an interchange.

Application of the fault monitoring system requires definition of the parameters and associated monitors, which are then updated in real time on the running system. The output of the evaluation engine is then fed into a management function that may be used to drive an interchange or alarm. The evaluation engine and management functions are both part of the state-of-health agent. This system is simple, efficient and extensible.

To prevent unnecessary module state interchanges from occurring when the same fault occurs almost simultaneously on the active and standby modules, a delay may be selectively applied before recording the fault on the active module. This delay allows the fault to be recorded on the standby module first and then the active. Thus, when the agent 400 compares the states of health of the two modules, it will always see the standby module as the less healthy of the two modules and do nothing. The length of the delay depends on how far apart the simultaneous fault can be detected by both modules. When the fault is cleared, the process is reversed; that is, the fault is cleared on the active module first and then on the standby module.

The bit array of one configuration is shown in FIG. 6. Each parameter name column represents a different word of memory. The array includes sets of critical and relative parameters.

Critical parameters are task monitor (refers to a set of monitors that are responsible for verifying the health and normal processing flow of the host processor 304, e.g., task sanity faults, task deleted fault, task exception fault, task suspended fault, and task panic fault)), critical link (refers to a set of monitors that detect a fault with one or more selected critical links that may be localized to the module), no DSP (refers to a set of monitors that determine when all DSP parameters are in the FAULTED state), board Out Of Service or OOS (refers to a set of monitors that determine when the module is out of service), hardware (refers to a set of monitors that identify failures indicative of a problem detected by hardware devices and reported in various hardware registers (e.g., core sanity faults, Phase Locked Loop faults, and clock faults)), aggregator communication (refers to a set of monitors detecting a failure when packets are transmitted to or received by the aggregator), and firmware resource (refers to a set of monitors that identify an unexpected runtime failure (e.g., message buffer pool faults, network buffer faults, message queue faults, and duplication token fault)).

Relative parameters are relative link (refers to a set of monitors that detect a fault with one or more selected non-critical links), first DSP (refers to a set of monitors that identify a fault of the first DSP (e.g., a core fault, DSP reset fault, and DSP out-of-service fault)), second DSP (refers to a set of monitors that identify a fault of the second DSP (e.g., a core fault, DSP reset fault, and DSP out-of-service fault)), third DSP (refers to a set of monitors that identify a fault of the third DSP (e.g., a core fault, DSP reset fault, and DSP out-of-service fault)), fourth DSP (refers to a set of monitors that identify a fault of the fourth DSP (e.g., a core fault, DSP reset fault, and DSP out-of-service fault)), software state of health (refers to a set of monitors that indicate a fault condition when an alarm is raised against the module), denial of service attack (refers to a set of monitors that detect an attack on the module (e.g., an attack on the real interface can affect service because certain types of packets are sent over the interface)), IP conflict (refers to a set of monitors that detect a conflict for the IP address for the real interface), and network configuration (refers to a set of monitors that identify when specified types of control messages fail (e.g., a request to update valid network configuration parameters)).

Referring now to FIG. 7, the operation of the agent 400 will now be discussed.

In step 700, the agent in the selected module collects the states of selected health parameters from various associated monitors and populates the bit array.

In optional decision diamond 704, the agent 400 determines whether the bit array has changed since the last notification to the other module. If so, the agent 400 in step 708 sends a representation of the bit array to the agent 400 of the other module. In one configuration, the values of the integer values of the 4½ words, or 32-bit memory words, are sent to the other module. The transmission is preferably made over the private link 216. If that link is down, the transmission is made over the LAN 144. In one configuration, step 708 is performed whether or not the bit array has changed. If the bit array has not changed or after performing step 708, the agent 400, in decision diamond 716, determines whether a state transition is required. This determination is performed by a two-tiered query. First, is the selected module's cumulative health state value and greater (or less) than the peer module's cumulative health state value and second, whether the two modules respective cumulative health state values are at least a minimum threshold value.

To perform the first query, the agent 400 compares the bit array of the selected module with the bit array of the other module and determines whether the selected module is healthier. In one configuration, if the selected module is already the active module, it increases the sum of its weighted parameters by a selected value to bias the comparison in its favor. In one configuration, this comparison is only made if either the bit array of the other module has been updated and/or a local transition of a parameter has been detected. To perform the second query, the agent determines whether a critical parameter is FAULTED. In one configuration, the sum of the representative integers or words must have a minimum value represented by each of the critical parameters being set or GOOD. That minimum value represents a module that is healthy enough to be the active module. Above this health threshold, the relative health is determined by the sum of the relative parameters. When a critical parameter is FAULTED, the agent 400 generates and sends a fault notification to an appropriate address. If the selected module is healthier and both modules have at least a minimum state of health, the selected module, if not already the active module, sets its state to active and assumes control of the TDM bus. If the active module is incapable of disabling TDM access due to the nature of the fault, it executes a self-reset, and the other module detects the reset within a short time, typically 200 milliseconds. If the other module is the active module and is deemed to be not as healthy as the selected module or if a health update is not received from the active module with a selected time, the selected module requests the active module to relinquish the TDM bus and the duplication token. If no reply is received within a configurable time, the selected module transmits a reset command over one of the links and causes the reset agent 428 of the other module to reset the module to force release of the duplication token. The reset agent is typically implemented in hardware to maximize the probability of correct operation in a faulting system.

After performing either step 728 or 732, the agent 400 proceeds to decision diamond 736 and determines whether a message with a timeout has been received. In particular, a message will cause the processing loop to execute before time has expired. In one configuration, the time interval is 125 milliseconds. If the message has been received, the agent 400 returns to and repeats decision diamond 700.

Figure 10:
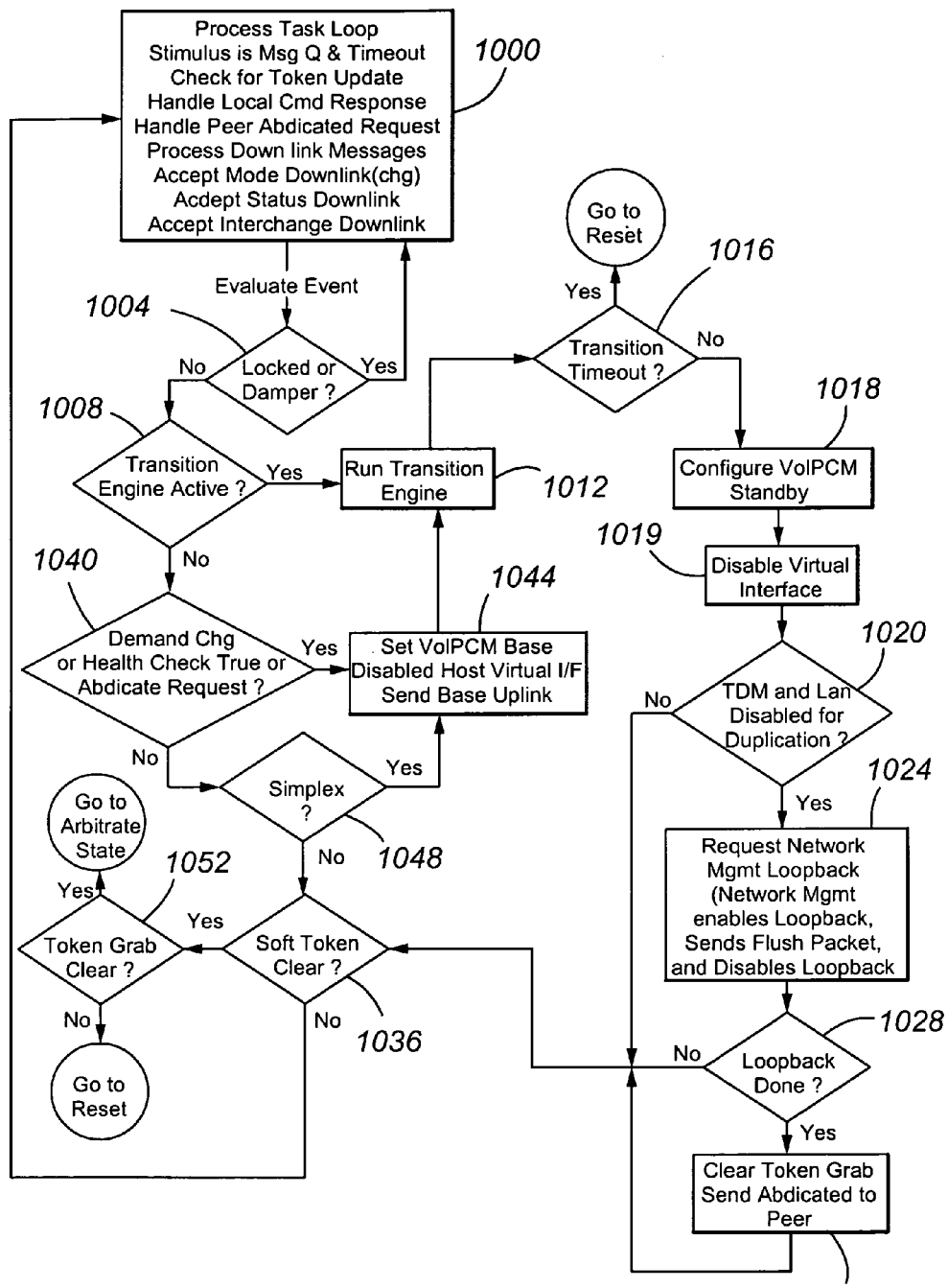
FIG. 10 is a flowchart depicting an operation according to an embodiment of the present invention.
Figure 11:
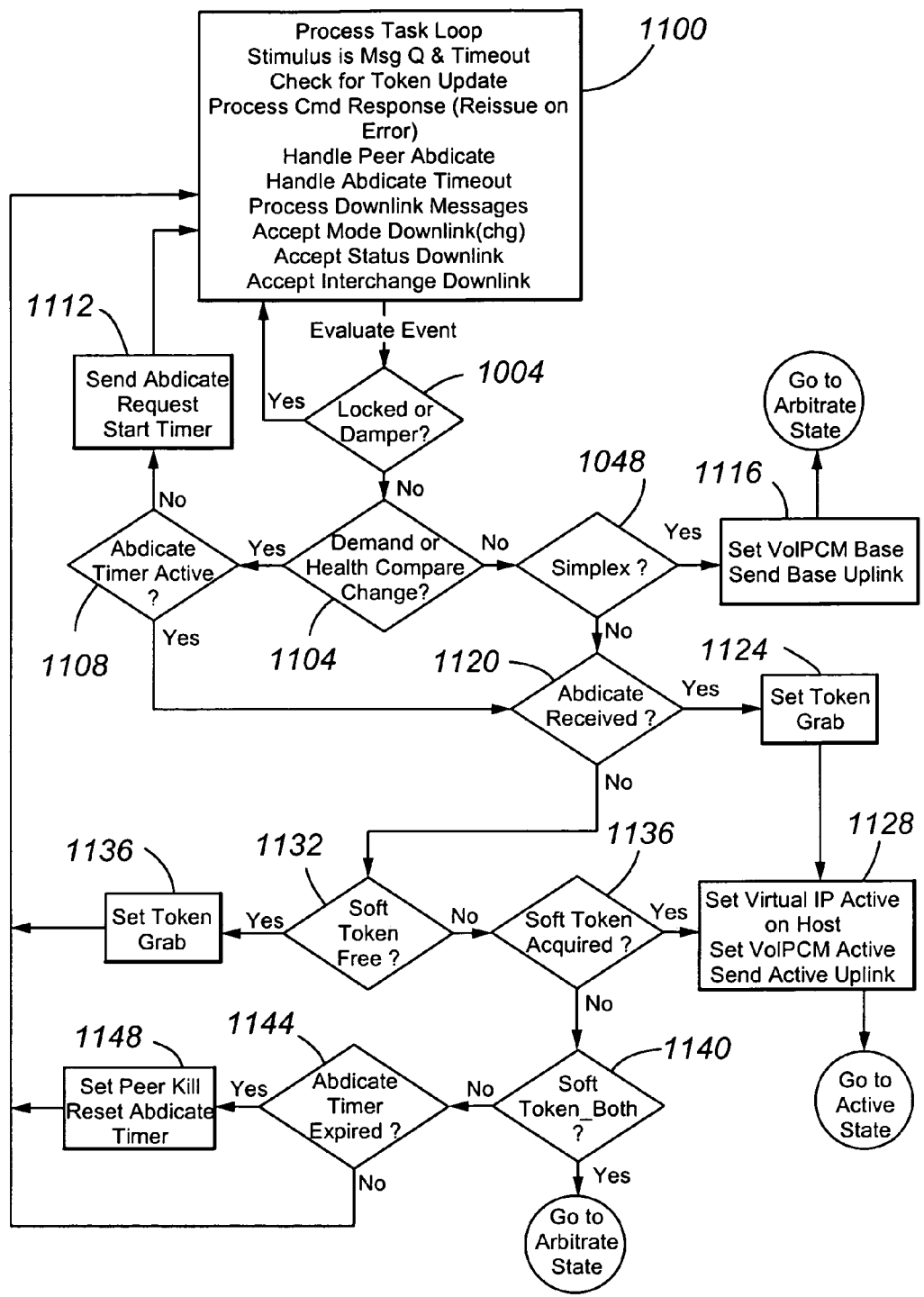
FIG. 11 is a flowchart depicting an operation according to an embodiment of the present invention.

The methodology for transitioning between the active and standby states will now be described with reference to FIGS. 10-11. FIG. 10 is the logic for the host module transitioning from the active to passive state, and FIG. 11 is the logic for the host module transitioning from the passive to the standby state.

In the methodology, the arbitrate state is the state used to determine whether the host module can become the active module, or enter into the active state, in a duplicated system. In the arbitrate state, the host module ensures that its peer connection is configured and starts trying to exchange peer health and status messages. In the arbitrate state, the state of health agent also needs to obtain and maintain local health status to exchange the status with the peer module and evaluate the host module's suitability to be the active board. The host module remains in the arbitrate state long enough to ensure that it has enough information to make a decision about its suitability to be the active module and that it has exclusive ownership of the duplication token. The hardware token has a relatively slow update cycle (typically greater than 50 milliseconds), and the update cycles are not synchronized between modules. To ensure exclusive ownership requires waiting at least two update cycle times.

For example with respect to FIG. 5, assume that a first module with the higher address has apparently acquired the duplication token without contention from the second module. If the second module now enters the arbitrate state, it will expect, in decision diamond 540, that the first module, in step 544, will clear its token grab and relinquish ownership of the duplication token. The first module, however, will have already proceeded to the active state and will not relinquish the duplication token. After several contention periods have expired, the second module, as a result of decision diamond 552, will yield the duplication token and proceed to the standby state.

Preferably, a duplication token is not asserted with every timing signal from the tick function due to high processing overhead. Typically, a tick occurs every five milliseconds, and a duplication token is asserted every 200 milliseconds (or about every 40 ticks). This limits the controlled health timeout to ⅕ second, even when the embedded software encounters an exception and is present but not participating.

Referring now to FIG. 10, the process task loop stimulus, in step 1000, is the receipt from the higher process control software of a mode, status, or interchange message in the message queue or a timeout. As can be seen from step 1000, the agent has reached the active state and is no longer acting upon token contention. Transition from the active state is initiated by either an interchange command, an abdicate request issued by the peer module, or through notification from the state of health agent 400 that the health comparison indicates a failover is desired. An abdicate request is a request to the standby module from the active module to transition to the active state for a specified reason, including a failed health check by the active module. When the stimulus occurs, the agent 408 proceeds to decision diamond 1004.

In decision diamond 1004, the agent determines whether the host module is in the locked state or a damper timer is set. Upon entry into the active state, the agent sets a damper timer to prevent rapid oscillation between the modules. When the host module is in the locked state or the damper timer is not yet expired, the agent returns to step 1000.

When the host module is not in the locked state and the damper timer has expired, the agent 408, in decision diamond 1008, determines whether a transition engine, which is a part of the agent's logic, is active. The transition engine sequences through the steps required to accomplish an abdication. These steps include, for example, taking the host module off of the TDM backplane or all of the talk channels and causing the host module to cease signaling using the virtual address and commence signaling using the module's local address. These steps are discussed with reference to steps 1018, 1019, 1024, and 1032 below. When the transition engine is unable to ensure that abdication is successful, such as due to a failed interface or corrupt driver, the engine will drive a module reset to disable traffic flow. When the reset occurs, the duplication token will be released by the reset module, and the peer module will become active. When the transition engine is active, the agent proceeds to step 1012 and enables the transition engine.

In decision diamond 1016, the agent determines whether the transition period has expired. As noted, any state transition must be completed within a selected period of time or transition period. This prevents the agent from hanging while waiting for a component to respond to a command or request. When the transition has expired without completion of the transition, the agent causes the module to reset itself. When the transition has not yet expired, the agent, in steps 1018 and 1019, configures the local process controller to be on standby and requests the local controller to disable the host module's use of the virtual TDM and LAN interface.

In decision diamond 1020, the agent determines whether the TDM and LAN interfaces are disabled for duplication. If so, the agent, in step 1024, requests a flush packet to be sent to clear the buffers of any messages that are addressed to the now disabled TDM or LAN interface. The flush packet is sourced to the corresponding interface address in a loopback mode. When the packet returns to the host module, the agent confirms that every packet addressed to the virtual address is no longer capable of being sent.

In decision diamond 1028, the agent determines whether the loopback has been completed. If so, the agent, in step 1032, clears the token grab and sends an abdicated notification to the peer module.

After step 1032 or when loopback has not been completed in decision diamond 1028, the agent proceeds to decision diamond 1036 (discussed below).

Returning to decision diamond 1008, when the transition engine is not active the agent, in decision diamond 1040, determines whether the reason for the state transition is a result of a command from the higher level control software, an abdicate request from the peer module, or a failed state of health check. When the reason for the state transition is one of the foregoing, the agent proceeds to step 1044 and commands the local controller to go from active to base mode, disable the virtual interface of the host module, and then go to standby.

When the reason for the state transition is not one of the options in decision diamond 1040, the agent, in decision diamond 1048, determines whether the host module is in simplex mode. If so, the agent proceeds to step 1044. If not, the agent proceeds to decision diamond 1036.

In decision diamond 1036, the agent determines whether the duplication token is clear, or the host module does not currently own the token. If the duplication token is clear, the agent returns to step 1000. If the duplication token is not clear, the agent, in decision diamond 1052 determines whether the token grab is clear. If so, the agent proceeds to the arbitrate state. If not, the agent performs a self-reset of the host module.

Turning now to FIG. 11, the stimulus, in step 1100, is the same as that in step 1000. The agent processes mode, status and interchange commands. The typical reason for the passive module transitioning to the active state is one or more of a command from the higher level control software, a failed health check by the peer module, or an abdicated notification from the peer module.

When a stimulus occurs, the agent performs decision diamond 1004. In decision diamond 1104, the agent determines whether the reason for the transition is a demand from the higher level software or a failed health check by the peer module. When the reason is a demand or failed health check, the agent in decision diamond 1108 determines whether an abdicate timer is active. If not, the agent, in step 1112, sends an abdicate request to the peer module and starts the timer.

Returning to decision diamond 1104, when the reason is a demand or failed health check the agent performs decision diamond 1048. When the host module is in simplex mode, the agent proceeds to step 1116 and performs the same set of functions as in step 1044 above. The agent then proceeds to the arbitrate state.

When the abdicate timer is active (decision diamond 1108) or the host module is not in the duplex mode (decision diamond 1048), the agent, in decision diamond 1120 determines whether an abdicated notification has been received. If so, the agent, in step 1124, sets the token grab and, in step 1128, sets the virtual interface of the host module to active, sets the local controller to active, and sends an active notification to the higher level software. The agent then goes to the active state.

Returning to decision diamond 1120, when an abdicate notification has not been received from the peer module, the agent, in decision diamond 1132, determines whether the duplication token is free. When the token is free, the agent, in step 1136, sets the token grab and returns to step 1100.

When the token is not free, the agent, in decision diamond 1136, determines whether the host module has acquired the soft token. As will be appreciated, when a first module owns the token and fails to "refresh" the token by asserting the token at the proper time the first module resets itself automatically (due to the hardware watchdog functionality whereby the module is reset automatically if the software fails to perform a specified operation within a specified time of a given tick) and, as long as the first module has not been reset and the tick function is operating properly, the token is maintained by that module.

When the token has been acquired by the host module, the agent proceeds to step 1128.

When the token has not been acquired by the host module, the agent, in decision diamond 1140, determines whether both modules are asserting the duplication token, meaning that the modules are in contention. If so, the agent proceeds to the arbitrate state. If not, the agent proceeds to decision diamond 1144 and determines whether the abdicate timer has expired. When the timer has expired, the agent, in step 1148, causes the peer module to be reset. After step 1148 or when the abdicate timer has not yet expired, the agent returns to step 1100.

Packet Sequence Synchronization Mechanism

The operation of the packet sequence synchronization agent 420 will now be discussed. Prior to discussing the agent's operation, it is important to understand the importance of packet sequence synchronization during module transitions. As used herein, packet sequence synchronization refers to continual or periodic updates of packet sequence numbers on either or both of the transmit and receive channels. As will be appreciated, the packet sequence number in RTP is a 16-bit value capable of representing a number between 0 and 65,535. The number increases in time based on the size of the RTP frame designated in the codec used to set up the call. When the RTP sequence number reaches its limit of 65,535, it resets to zero and increments the sequence number rollover counter maintained independently by both the sender and receiver of the packet flow.

When the standby module becomes the active module, it must assume seamlessly the encryption functions of the formerly active module. Thus, the newly active module needs the decryption and encryption keys of the formerly active module, which requires the newly active module to know approximately the packet sequence numbers in the transmit and receive packet streams for each communication session. As will be appreciated, the roll over counter is used in the key. An error in packet sequence number synchronization can cause encryption and decryption errors.

Additionally, it is important that the newly active module not repeat previously used sequence numbers after assuming the active role. Although a "jump forward" in packet sequence numbers is handled during normal operation provided that the "jump forward" does not exceed a definable value, a "jump backward" causes frames to be dropped until the flow reaches the currently expected sequence number. If the jump forward exceeds the definable value, packets may be discounted as out-of-order packets and discarded.

In the absence of silence suppression, the active and standby modules' sequence numbers should be relatively close to one another. Calls to IP endpoints are normally set up on both modules concurrently. The agent 420 on the modules knows that the call is a duplicated call and whether or not the host module is in the active or standby state, must track call state information for any states that are kept on the module and not reported to the server 112, and keep the call state synchronized between the modules. In this configuration, the active module processes inbound RTP packets into PCM data for the TDM backplane and PCM data from the TDM backplane into RTP packets. The standby module does not accept packets from the packet-switched network on the virtual interface and sends no packets to the packet-switched network on the virtual interface. The standby module continues to listen to the TDM bus and processes packets to the aggregator, which will drop the packets for the virtual interface. While the standby module is not processing inbound packets and therefore has no knowledge of the inbound or receive packet sequence number on the active module, both modules increment the outbound or transmit packet sequence number. The talk channels of the standby module are disabled on the TDM side. In the event of a failure or in response to a command, the active module stops issuing RTP packets on the virtual interface and disables PCM flows to the TDM backplane. The standby module then activates the same MAC and IP addresses used by the formerly active module and begins issuing RTP packets generated from the same backplane TDM time slots used on the formerly active module. When the packet-switched network sees the RTP packets sourced from the newly active module, the network will relearn the MAC address and automatically begin to forward the far end RTP packets to the newly active module.

The gap in sequence number value between the active and standby modules will vary in time differently for the receive and transmit packet flows. The receive sequence number on the standby module is synchronized with the active module at the time the active module sends its current receive sequence number and from that point the gap between the receive sequence number of the active and standby modules increases at a rate defined by the codec frame size, with the active module moving forward in time. The synchronization period for the receive sequence number is preferably short enough to ensure correct handling of the sequence number boundary condition (e.g., the roll over counter value) in the event of a fail over to the standby board. The standby module's sequence number will normally be behind the active module's number due to the delay between processing the packet and propagating the information to the standby module. This natural drift ensures that the standby module can always assume a "jump forward" to the sequence number of the first packet it receives if it becomes active (as long as the gap does not become excessive). The transmit packet sequence number on the standby module needs to be synchronized with the initial value on the active module plus a shift value to ensure that, in the event of a failover, the packets seen at the remote endpoint represent a jump forward in sequence number. This jump is preferably small enough to ensure correct handling of the sequence number boundary but large enough to cause the receiver to flush its buffers and immediately re-acquire the flow. In selecting the shift value, drift between the transmit sequence numbers on the active and standby modules must be accounted for. In the absence of silence suppression, both modules should track with a constant shift between the active and standby modules. When silence suppression is enabled, the lack of inbound RTP data can cause a difference in outbound packet generation if the echo cancellation algorithm removes background signal on the active but not the standby module. As a result, the transmit packet sequence number of the standby module will drift ahead of its counterpart on the active module, causing the shift value to be a negative number.

The operation of the packet sequence synchronization agent 420 will now be discussed with reference to FIGS. 8 and 9.

Figure 8:
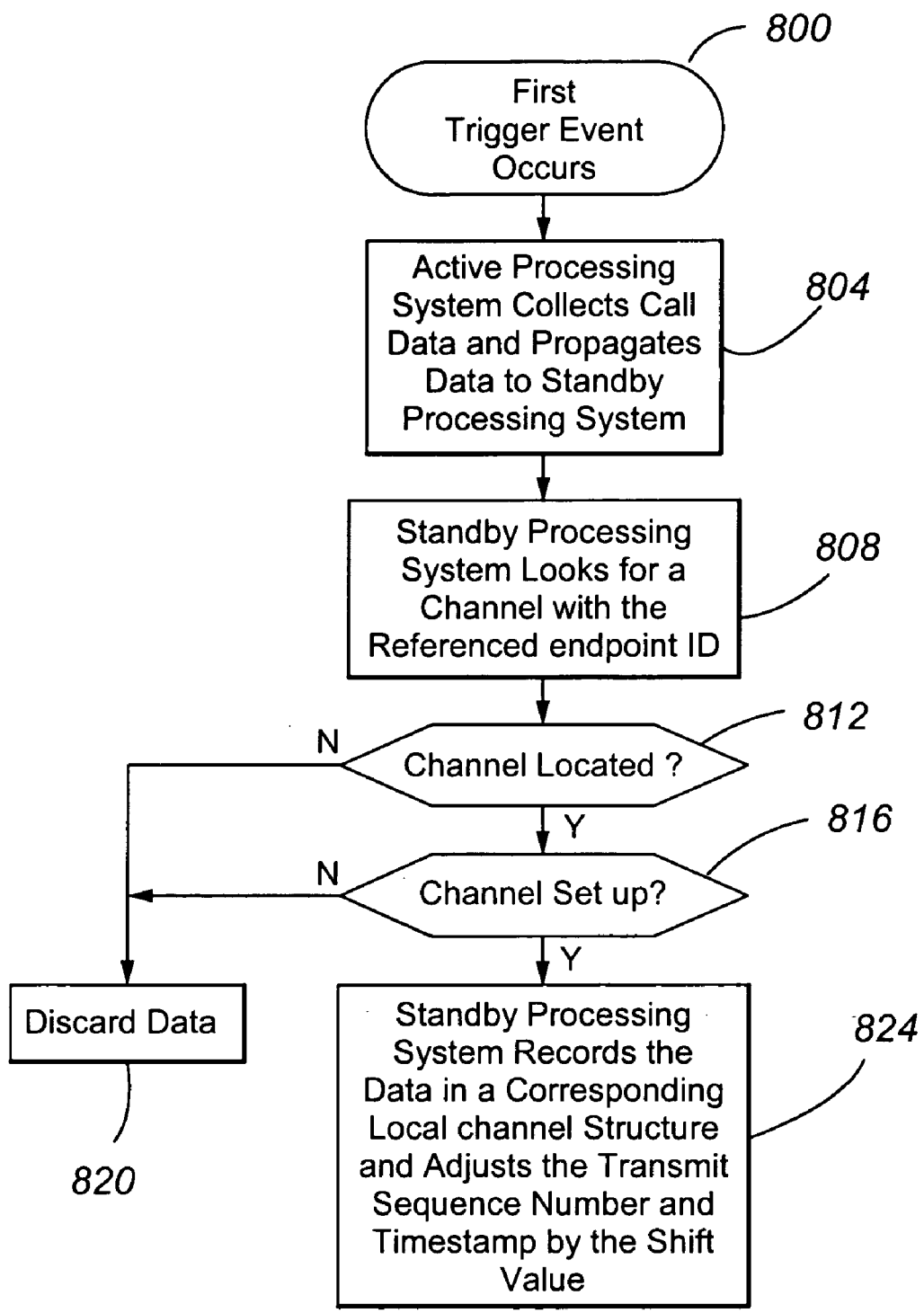
FIG. 8 is a flowchart depicting the operation of the packet sequence synchronization agent according to an embodiment of the present invention.

Referring to FIG. 8, the operation commences 800 when a first trigger event occurs. The first trigger event can be one or more of the passage of a selected period of time (e.g., every 100 to 200 milliseconds), the establishment of a call on the active module, validation by the active module of data associated with an established call, and on demand. In step 804, the agent 420 in the active module will collect reliability data associated with the call and propagate the reliability data to the standby module. The reliability data can include the codec frame size defined for the call, the current transmit and receive packet sequence numbers for the call, endpoint identifier (of the source endpoint), timestamp resolution defined for the call, shift value (which may be time-based or a packet sequence number), and/or the rollover counter value. In decision diamond 812, the agent 420, on the standby module, looks for a channel with the endpoint identifier. If no channel is associated with the endpoint identifier, the agent discards the data in step 820. If the channel is located, the agent, in decision diamond 816, next determines whether the identified channel has been set up completely (e.g., open on the VoIP subsystem). If the channel has not been set up completely, the data is discarded in step 820. If the channel has been set up completely, the agent records the reliability information in its local channel structure associated with the identified channel, adjusts the packet transmit sequence number and timestamp by the shift value, and sends it to the VoIP subsystem in a reliability information change request. The agent in the standby module commonly converts the time-based shift value received from the active module into a transmit sequence number value and timestamp by converting the shift time into a sequence number using the codec frame size defined for the call and converting the shift time to the timestamp resolution defined for the call. The active module must then send new update information at a frequency that ensures that the gap between the transmit sequence numbers on the active and standby modules does not widen beyond an acceptable limit. In one configuration, these computations are performed by the agent of the active module and the results are provided by the reliability information update to the agent of the standby module.

Figure 9:
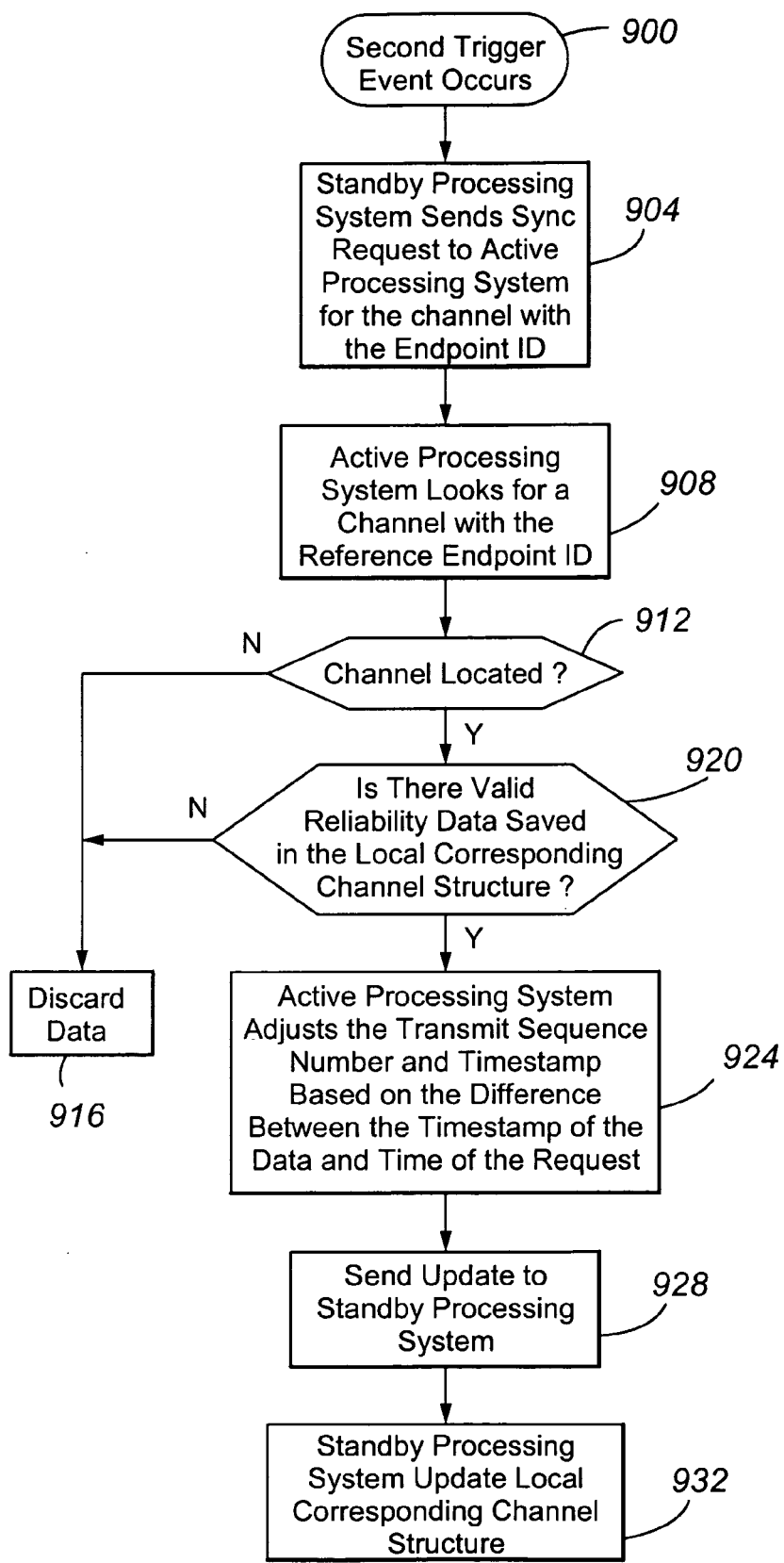
FIG. 9 is a flowchart depicting the operation of the packet sequence synchronization agent according to an embodiment of the present invention.

Referring now to FIG. 9, a second trigger event commences 900 the operation. The second trigger event can be one or more of the passage of a selected period of time (e.g., every 100 to 200 milliseconds), the establishment of a call on the standby module, and validation by the standby module of data associated with an established call. In step 904, the agent 420 of the standby module sends a sync request to the active module for the channel with the endpoint identifier. The sync request includes the endpoint identifier associated with the call. In response, the agent 420 in the active module looks for a channel with the referenced endpoint identifier. In decision diamond 912, the agent 420, on the active module, determines whether a channel with the endpoint identifier exists. If no channel is associated with the endpoint identifier, the agent discards the request in step 916. If the channel is located, the agent, in decision diamond 920, next determines whether there is valid reliability data saved in the local corresponding channel structure. If not, the agent proceeds to step 916. If so, the agent, in step 924, collects reliability data associated with the call and adjusts the transmit sequence number and timestamp based on the difference between the timestamp of the data and the time of the request. It then generates the reliability information update for the adjusted channel and, in step 928, forwards the update to the standby module. Upon receipt and validation, the standby module, in step 932, updates its local channel structure associated with the call.

The receive sequence number is updated using a time-based approach in which the active module periodically forwards a reliability information update to the standby module containing the endpoint identifier and current packet sequence number value.

When the standby module takes over the RTP packet streams, the formerly active and standby modules calculate the same starting SSRC using the endpoint identifier and UDP port.

Whenever an interchange occurs, all channels on the newly standby module are closed and reopened with a refresh from the server. If this unrefresh/refresh operation is omitted, the newly standby module would be required to perform a self resynchronization by going through each active channel and calculating new transmit sequence number and timestamp values for each channel by applying both the difference between the current time and the time of the last locally recorded information event plus the standby shift value.

A number of variations and modifications of the invention can be used. It would be possible to provide for some features of the invention without providing others.

For example in one alternative embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof.

Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) providing first and second processing devices, the second processing device providing duplicate functions to the first processing device;
   (b) determining, by the first processing device, that a token grab value in a memory of the first processing device has a first, but not a second, value, wherein the first value requires the first processing device to attempt to obtain ownership of a duplication token and a second value requires the first processing device not to attempt to obtain ownership of the duplication token;
   (c) in response to the token grab value having the first value, determining, by the first processing device, whether the second processing device has asserted a duplication token; and
   (d) in a first mode, determining, by the first processing device, that the second processing device has not asserted the duplication token, and asserting, by the first processing device, the duplication token, wherein, upon assertion by the first processing device, the duplication token is owned by the first processing device and the first processing device is in the active state and the second processing device is in the standby state; and
   (e) in a second mode, determining, by the first processing device, that the second processing device has asserted the duplication token and that the duplication token is in contention between the first and second processing devices, and applying, by the first processing device, an arbitration rule to determine which of the first and second processing devices is to have ownership of the duplication token.

2. The method of claim 1, wherein the duplication token is a hardware supported semaphore that signals unequivocally that one of the first and second processing devices is in possession of a Time Division Multiplexed ("TDM") resource and an electronic address.

3. The method of claim 2, wherein the duplication token is maintained by a tick function of an operating system of one of the first and second processing devices, and wherein the duplication token is asserted in a register of a field programmable gate array in each of the first and second processing devices, and wherein the duplication token resolves to a single memory value, the single memory value indicating a state of the duplication token and the state being one of available, owned, and contended.

4. The method of claim 1, wherein, when the second processing device does not release the duplication token during a selected time interval, the second processing device is forced to reset.

5. The method of claim 1, wherein the first mode is performed.

6. The method of claim 1, wherein the second mode is performed and wherein the first and second processing devices assign ownership of the duplication token based on at least one selected criterion that is associated with each of the first and second processing devices.

7. The method of claim 6, wherein the selected criterion is at least one of a Time Division Multiplexed ("TDM") bus timeslot address, module hardware identifier, and a mathematically differentiable value unique between the first and second processing devices contending wherein the first and second processing devices are configured to access a TDM bus, wherein the first and second processing devices are interconnected by a private and arbitration link, each link having a bus configuration, wherein the duplication token is asserted over the private link, and wherein the first and second processing devices arbitrate ownership of the token over the arbitration link.

8. The method of claim 1, further comprising:
   (f) determining a bit array comprising a plurality of bit sets, each bit set corresponding to at least one functional parameter, each of the functional parameters defining a state of a functional aspect of the corresponding one of the first and second processing devices, a first type of functional parameter indicating a critical functional aspect and a second type of functional parameter indicating a noncritical functional aspect;
   (g) for each of the first and second processing devices, arithmetically assigning, based on the values of the plurality of bit sets, respectively, first and second cumulative health state values;
   (h) when the second cumulative health state value equals or exceeds the first cumulative health state values, maintaining the second processing device in the active state; and
   (i) when the first cumulative health state value exceeds the second cumulative health state value, changing the state of the first processing device from the standby to the active state and the state of the second processing device from the active to the standby state.

9. The method of claim 6, wherein a third party does not perform arbitration between the first and second processing devices, wherein the duplication token is a bit value asserted in a register of a field programmable gate array, and wherein the token grab value is stored in memories of the first and second processing devices.

10. The method of claim 1, wherein the second processing device has, for each call, a transmit packet stream and a second transmit packet sequence number and transmit rollover counter value, wherein the first processing device has, for each call, a first transmit packet sequence number and transmit rollover counter value, the first transmit packet sequence number being representative of the second transmit packet sequence number and the first transmit rollover counter value being representative of the second transmit rollover counter value and further comprising:
   (e) the first processing device incrementing the first transmit packet sequence number and rollover counter while in the standby state; and
   (f) upon the occurrence of a trigger event, adjusting the first transmit packet number and/or rollover counter values by a shift value representative of a temporal drift between the relative values of the first and second transmit packet number values.

11. A duplicated processing system, comprising:
   first and second processing devices, the second processing device providing duplicate functions to the first processing device, wherein:
      the first processing device is operable to (a) determine that a token grab value in a memory of the first processing device has a first, but not a second, value, the first value requiring the first processing device to attempt to obtain ownership of a duplication token and a second value requiring the first processing device not to attempt to obtain ownership of the duplication token, (b) in response to the token grab value having the first value, determine whether the second processing device has asserted a duplication token; and (c) operate in the following modes:
         (i) in a first mode when the second processing device has not asserted the duplication token, the first processing device asserts the duplication token, wherein, upon assertion by the first processing device, the duplication token is owned by the first processing device and the first processing device is in the active state and the second processing device is in the standby state; and
         (ii) in a second mode when the second processing device has asserted the duplication token, the duplication token is in contention between the first and second processing devices and the first processing device applies an arbitration rule to determine which of the first and second processing devices is to have ownership of the duplication token.

12. The system of claim 11, wherein the duplication token is a hardware supported semaphore that signals unequivocally that one of the first and second processing devices is in possession of a Time Division Multiplexed ("TDM") resource and an electronic address.

13. The system of claim 11, wherein the duplication token is maintained by a tick function of an operating system of one of the first and second processing devices, and wherein the duplication token is asserted in a register of a field programmable gate array in each of the first and second processing devices, and wherein the duplication token resolves to a single memory value, the single memory value indicating a state of the duplication token and the state being one of available, owned, and contended.

14. The system of claim 11, wherein, when the second processing device does not release the duplication token during a selected time interval, the second processing device is forced to reset.

15. The system of claim 11, wherein, in the second mode, the first and second processing devices assign ownership of the duplication token based on at least one selected criterion that is associated with each of the first and second processing devices.

16. The system of claim 15, wherein the selected criterion is at least one of a Time Division Multiplexed ("TDM") bus timeslot address, module hardware identifier, and a mathematically differentiable value unique between the first and second processing devices contending wherein the first and second processing devices are configured to access a TDM bus, wherein the first and second processing devices are interconnected by a private and arbitration link, each link having a bus configuration, wherein the duplication token is asserted over the private link, and wherein the first and second processing devices arbitrate ownership of the token over the arbitration link.

17. The system of claim 11, further comprising:
   a state-of-health agent, executable by a processor, operable to:
      determine a bit array comprising a plurality of bit sets, each bit set corresponding to at least one functional parameter, each of the functional parameters defining a state of a functional aspect of the corresponding one of the first and second processing devices, a first type of functional parameter indicating a critical functional aspect and a second type of functional parameter indicating a noncritical functional aspect;
      for each of the first and second processing devices, arithmetically assign, based on the values of the plurality of bit sets, respectively, first and second cumulative health state values;
      in a first mode when the second cumulative health state value equals or exceeds the first cumulative health state values, maintaining the second processing device in the active state; and
      in a second mode when the first cumulative health state value exceeds the second cumulative health state value, changing the state of the first processing device from the standby to the active state and the state of the second processing device from the active to the standby state.

18. The system of claim 15, wherein a third party does not perform arbitration between the first and second processing devices, wherein the duplication token is a bit value asserted in a register of a field programmable gate array, and wherein the token grab value is stored in memories of the first and second processing devices.

19. The system of claim 11, wherein the second processing device has, for each call, a transmit packet stream and a second transmit packet sequence number and transmit rollover counter value, wherein the first processing device has, for each call, a first transmit packet sequence number and transmit rollover counter value, the first transmit packet sequence number being representative of the second transmit packet sequence number and the first transmit rollover counter value being representative of the second transmit rollover counter value and further comprising:
   a packet sequence synchronization agent, executable by a processor, operable to:
      increment, in the standby second processing device, the first transmit packet sequence number and rollover counter while in the standby state; and upon the occurrence of a trigger event, adjust the first transmit packet number and/or rollover counter values by a shift value representative of a temporal drift between the relative values of the first and second transmit packet number values.

20. A method, comprising:
(a) determining, by each of first and second processing devices, a corresponding bit array comprising a plurality of bit sets, each bit set corresponding to at least one functional parameter, each of the functional parameters defining a state of a functional aspect of a corresponding processing device, a first type of functional parameter indicating a critical functional aspect and a second type of functional parameter indicating a noncritical functional aspect;
(b) by each of the first and second processing devices, arithmetically assigning, based on the values of the plurality of bit sets in the corresponding bit array first and second cumulative health state values respectively;
(c) in a first mode, determining by one of the first and second processing devices that the second cumulative health state value equals or exceeds the first cumulative health state value and, in response, maintaining the second processing device in an active state; and
(d) in a second mode, determining by one of the first and second processing devices that the first cumulative health state value exceeds the second cumulative health state value and, in response, changing the state of the first processing device from a standby to the active state and the state of the second processing device from the active to the standby state.

21. The method of claim 20, wherein, in the arithmetically assigning step (b), the first type of functional parameters are weighted more heavily than the second type of functional parameters and wherein the arithmetic operation is addition.

22. The method of claim 20, wherein each of the functional parameters has a corresponding monitor, wherein a first type of monitor must be constantly activated to remain in a good state, wherein a second type of monitor is in a faulted state unless activated, and wherein a third type of monitor is set to one of the good or faulted states at each activation.

23. The method of claim 20, wherein, in the comparison of the first and second cumulative health state values, the second cumulative health state value is biased, wherein each of the functional parameters has a weight value that is a function of a priority level of the parameter, wherein the first and second processing devices exchange respective cumulative state values periodically, and further comprising:
(e) each of the first and second processing devices comparing the respective one of the first and second cumulative health state values to a selected threshold to determine whether the corresponding processing device is sufficiently healthy to be in the active state.

24. The method of claim 20, wherein the second processing device has, for each call, a transmit packet stream and a second transmit packet sequence number and transmit rollover counter value, wherein the first processing device has, for each call, a first transmit packet sequence number and transmit rollover counter value, the first transmit packet sequence number being representative of the second transmit packet sequence number and the first transmit rollover counter value being representative of the second transmit rollover counter value and further comprising:
(e) the first processing device incrementing the first transmit packet sequence number and rollover counter while in the standby state; and
(f) upon the occurrence of a trigger event, adjusting the first transmit packet number and/or rollover counter values by a shift value representative of a temporal drift between the relative values of the first and second transmit packet number values.

25. The method of claim 20, further comprising:
(e) the first processing device determining whether a duplication token has been asserted by the second processing device during a selected time interval;
(f) when the duplication token has been asserted by the second processing device during the selected time interval, maintaining the first processing device in the standby state; and
(g) when the duplication token has not been asserted by the second processing device during the selected time interval, changing the state of the first processing device from the standby state to the active state, thereby causing the first processing device to assume control of a function performed previously by the second processing device.

26. The method of claim 25, wherein the selected time interval is a function of a tick function, wherein the function is control of a time division multiplexed bus and further comprising:
(h) when the duplication token has not been released by the second processing device during the selected time interval, resetting the second processing device.

27. The method of claim 25, wherein steps (e) and (f) are performed when the second processing owns the token and further comprising:
(h) the first and second processing devices each asserting a duplication token with a selected time period such that the ownership of the duplication token is contended by the first and second processing devices, wherein the first and second processing devices assign ownership of the token based on at least one selected criterion that is associated with each of the first and second processing devices.

28. The method of claim 25, wherein, when the duplication token is not owned by either the first or second processing device, further comprising:
(h) assigning ownership of the duplication token to the second processing device, when the first processing device fails to assert the token within a selected time period.

29. A system, comprising:
first and second processing devices, each of the first and second processing devices comprising a respective processor to execute a state-of-health agent, the state-of-health agent, when executed, performs the following operations:
(a) determine, for a corresponding one of the first and second processing devices, a corresponding bit array comprising a plurality of bit sets, each bit set corresponding to at least one functional parameter, each of the functional parameters defining a state of a functional aspect of the corresponding first or second processing device, a first type of functional parameter indicating a critical functional aspect and a second type of functional parameter indicating a noncritical functional aspect;
(b) arithmetically assign, based on the values of the plurality of bit sets in the corresponding bit array, a corresponding cumulative health state value, the first processing device having a first cumulative health state and the second processing device having a second cumulative health state;
(c) in a first mode, determine, by at least one of the state-of-health agents in the first and second processing devices, that the second cumulative health state value equals or exceeds the first cumulative health state value and, in response, maintain the second processing device in an active state; and (d) in a second mode, determine, by at least one of the state-of-health agents in the first and second processing devices, that the first cumulative health state value exceeds the second cumulative health state value and, in response, change the state of the first processing device from a standby to the active state and the state of the second processing device from the active to the standby state.

30. The system of claim 29, wherein, in the arithmetically assigning operation (b), the first type of functional parameters are weighted more heavily than the second type of functional parameters and wherein the arithmetic operation is addition.

31. The system of claim 29, wherein each of the functional parameters has a corresponding monitor, wherein a first type of monitor must be constantly activated to remain in a good state, wherein a second type of monitor is in a faulted state unless activated, and wherein a third type of monitor is set to one of the good or faulted states at each activation.

32. The system of claim 29, wherein, in the comparison of the first and second cumulative health state values, the second cumulative health state value is biased, wherein each of the functional parameters has a weight value that is a function of a priority level of the parameter, wherein the first and second processing devices exchange respective cumulative state values periodically, and further comprising the operation:

(e) each of the first and second processing devices compares the respective one of the first and second cumulative health state values to a selected threshold to determine whether the corresponding processing device is sufficiently healthy to be in the active state.

33. The system of claim 29, wherein the second processing device has, for each call, a transmit packet stream and a second transmit packet sequence number and transmit rollover counter value, wherein the first processing device has, for each call, a first transmit packet sequence number and transmit rollover counter value, the first transmit packet sequence number being representative of the second transmit packet sequence number and the first transmit rollover counter value being representative of the second transmit rollover counter value and further comprising the operations:

(e) the first processing device increments the first transmit packet sequence number and rollover counter while in the standby state; and (f) upon the occurrence of a trigger event, the first transmit packet number and/or rollover counter values is adjusted by a shift value representative of a temporal drift between the relative values of the first and second transmit packet number values.

34. The system of claim 29, further comprising the operations:

(e) the first processing device determines whether a duplication token has been asserted by the second processing device during a selected time interval;

(f) when the duplication token has been asserted by the second processing device during the selected time interval, the first processing device is maintained in the standby state; and (g) when the duplication token has not been asserted by the second processing device during the selected time interval, the state of the first processing device is changed from the standby state to the active state, thereby causing the first processing device to assume control of a function performed previously by the second processing device.

35. The system of claim 34, wherein the selected time interval is a function of a tick function, wherein the function is control of a time division multiplexed bus and further comprising the operation:

(h) when the duplication token has not been released by the second processing device during the selected time interval, the second processing device is reset.

36. The system of claim 34, wherein operations (e) and (f) are performed when the second processing owns the token and further comprising the operation:

(h) the first and second processing devices each assert a duplication token with a selected time period such that the ownership of the duplication token is contended by the first and second processing devices, wherein the first and second processing devices assign ownership of the token based on at least one selected criterion that is associated with each of the first and second processing devices.

37. The system of claim 34, wherein, when the duplication token is not owned by either the first or second processing device, further comprising the operation:

(h) ownership of the duplication token is assigned to the second processing device, when the first processing device fails to assert the token within a selected time period.

38. A method, comprising:

(a) providing first and second processing systems, the second processing system being in the active state and the first processing system being in the standby state, the second processing system having, for each call, a transmit packet stream and a second transmit packet sequence number and transmit rollover counter value, wherein the first processing system has, for each call, a first transmit packet sequence number and transmit rollover counter value, the first transmit packet sequence number being representative of the second transmit packet sequence number and the first transmit rollover counter value being representative of the second transmit rollover counter value;

(b) the first processing system incrementing the first transmit packet sequence number and rollover counter value while in the standby state; and (c) upon the occurrence of a trigger event, adjusting the first transmit packet sequence number and/or rollover counter value by a shift value representative of a temporal drift between the relative values of the first and second transmit packet sequence numbers, wherein the drift causes the first and second transmit packet sequence numbers to be different and wherein the drift is caused by silence suppression.

39. The method of claim 38, wherein the second processing system has, for each call, a receive packet stream and a second receive packet sequence number and receive rollover counter value, wherein the first processing system has, for each call, a first receive packet sequence number and receive rollover counter value, the first receive packet sequence number being representative of the second receive packet sequence number and the first receive rollover counter value being representative of the second receive rollover counter value, wherein the second receive packet sequence number and rollover counter values are exchanged upon the occurrence of the trigger event, and wherein the trigger event is one or more of the passage of a selected period of time, the establishment of a call on the second processing system, validation by the second processing system of data associated with an active call, establishment of a call on the first processing system, and validation by the first processing system of data associated with an active call.

40. The method of claim 38, wherein the adjustment is performed by the following substeps:
(c1) converting the shift time into a sequence number using the codec frame size defined for the call; and
(c2) converting the shift time to the timestamp resolution defined for the call.

41. The method of claim 38, further comprising:
(d) the first processing system determining whether a duplication token has been asserted by the second processing system during a selected time interval;
(e) when the duplication token has been asserted by the second processing system during the selected time interval, maintaining the first processing system in the standby state; and
(f) when the duplication token has not been asserted by the second processing system during the selected time interval, changing the state of the first processing system from the standby state to the active state, thereby causing the first processing system to assume control of a function performed previously by the second processing system.

42. The method of claim 38, further comprising:
(d) determining a bit array comprising a plurality of bit sets, each bit set corresponding to at least one functional parameter, each of the functional parameters defining a state of a functional aspect of a corresponding processing system, a first type of functional parameter indicating a critical functional aspect and a second type of functional parameter indicating a noncritical functional aspect;
(e) for each of first and second processing systems, arithmetically assigning, based on the values of the plurality of bit sets, respectively, first and second cumulative health state values;
(f) when the second cumulative health state value equals or exceeds the first cumulative health state values, maintaining the second processing system in an active state; and
(g) when the first cumulative health state value exceeds the second cumulative health state value, changing the state of the first processing system from a standby to the active state and the state of the second processing system from the active to the standby state.

43. The system of claim 38, further comprising the operations:
(c) determining a bit array comprising a plurality of bit sets, each bit set corresponding to at least one functional parameter, each of the functional parameters defining a state of a functional aspect of a corresponding processing device, a first type of functional parameter indicating a critical functional aspect and a second type of functional parameter indicating a noncritical functional aspect;
(d) for each of first and second processing devices, arithmetically assigning, based on the values of the plurality of bit sets, respectively, first and second cumulative health state values;
(e) when the second cumulative health state value equals or exceeds the first cumulative health state values, maintaining the second processing device in an active state; and
(f) when the first cumulative health state value exceeds the second cumulative health state value, changing the state of the first processing device from a standby to the active state and the state of the second processing device from the active to the standby state.

44. A system, comprising:
first and second processing devices, the second processing device being in the active state and the first processing device being in the standby state, the second processing device having, for each call, a transmit packet stream and a second transmit packet sequence number and transmit rollover counter value, wherein the first processing device has, for each call, a first transmit packet sequence number and transmit rollover counter value, the first transmit packet sequence number being representative of the second transmit packet sequence number and the first transmit rollover counter value being representative of the second transmit rollover counter value;
wherein the first processing device comprises a processor operable to execute a packet sequence synchronization agent, the packet sequence synchronization agent, when executed, is operable to perform the following operations:
(a) increment the first transmit packet sequence number and rollover counter value while in the standby state; and
(b) upon the occurrence of a trigger event, adjust the first transmit packet number and/or rollover counter values by a shift value representative of a temporal drift between the relative values of the first and second transmit packet number values, wherein the drift causes the first and second transmit packet number values to be different and wherein the drift is caused by silence suppression.

45. The system of claim 44, wherein the second processing device has, for each call, a receive packet stream and a second receive packet sequence number and receive rollover counter value, wherein the first processing device has, for each call, a first receive packet sequence number and receive rollover counter value, the first receive packet sequence number being representative of the second receive packet sequence number and the first receive rollover counter value being representative of the second receive rollover counter value, wherein the second receive packet sequence number and rollover counter values are exchanged upon the occurrence of the trigger event, and wherein the trigger event is one or more of the passage of a selected period of time, the establishment of a call on the second processing device, validation by the second processing device of data associated with an active call, establishment of a call on the first processing device, and validation by the first processing device of data associated with an active call.

46. The system of claim 44, wherein the adjustment is performed by the following suboperations:
(b1) converting the shift time into a sequence number using the codec frame size defined for the call; and
(b2) converting the shift time to the timestamp resolution defined for the call.

47. The system of claim 44, further comprising the operations:
(c) the first processing device determining whether a duplication token has been asserted by the second processing device during a selected time interval;
(d) when the duplication token has been asserted by the second processing device during the selected time interval, maintaining the first processing device in the standby state; and
(e) when the duplication token has not been asserted by the second processing device during the selected time interval, changing the state of the first processing device from the standby state to the active state, thereby causing the first processing device to assume control of a function performed previously by the second processing device.

* * * * *